United States Patent
Chao et al.

(10) Patent No.: US 11,932,249 B2
(45) Date of Patent: Mar. 19, 2024

(54) METHODS AND DEVICES FOR TRIGGERING VEHICULAR ACTIONS BASED ON PASSENGER ACTIONS

(71) Applicant: Mobileye Vision Technologies Ltd., Jerusalem (IL)

(72) Inventors: Min-An Chao, Munich (DE); Neslihan Kose Cihangir, Munich (DE); Rafael Rosales, Unterhaching (DE)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 18/077,258

(22) Filed: Dec. 8, 2022

(65) Prior Publication Data

US 2023/0174065 A1    Jun. 8, 2023

Related U.S. Application Data

(63) Continuation of application No. 16/830,312, filed on Mar. 26, 2020, now Pat. No. 11,568,655.

(51) Int. Cl.
| | |
|---|---|
| *B60W 30/16* | (2020.01) |
| *B60W 40/08* | (2012.01) |
| *B60W 60/00* | (2020.01) |
| *G06N 3/04* | (2023.01) |
| *G06T 7/50* | (2017.01) |

(Continued)

(52) U.S. Cl.
CPC ............ *B60W 30/16* (2013.01); *B60W 40/08* (2013.01); *B60W 60/001* (2020.02); *G06N 3/04* (2013.01); *G06T 7/50* (2017.01); *G06V 10/764* (2022.01); *G06V 10/82* (2022.01); *G06V 20/40* (2022.01); *G06V 20/58* (2022.01); *G06V 20/593* (2022.01); *G06V 20/597* (2022.01); *B60W 2420/42* (2013.01); *G06T 2207/10016* (2013.01); *G06T 2207/30252* (2013.01)

(58) Field of Classification Search
CPC .... B60W 30/16; B60W 40/08; B60W 60/001; B60W 2420/42; B60W 2540/229; B60W 2754/30; B60W 60/0015; B60W 50/00; G06N 3/04; G06N 20/00; G06T 7/50; G06T 2207/10016; G06T 2207/30252; G06V 10/764; G06V 10/82; G06V 20/40; G06V 20/58; G06V 20/593; G06V 20/597; G06V 2201/07; B60K 2310/264
USPC ........................................................... 701/27
See application file for complete search history.

(56) References Cited

U.S. PATENT DOCUMENTS

| | | | |
|---|---|---|---|
| 9,405,982 B2 * | 8/2016 | Zhang | G06V 40/18 |
| 11,295,458 B2 * | 4/2022 | Dasgupta | G06T 7/10 |
| 2020/0216027 A1 * | 7/2020 | Deng | H04L 63/1416 |

FOREIGN PATENT DOCUMENTS

JP    2004504219    *   2/2004    ........... G06V 10/143

* cited by examiner

*Primary Examiner* — Jerome Grant, II
(74) *Attorney, Agent, or Firm* — Finnegan, Henderson, Farabow, Garrett & Dunner, LLP

(57) ABSTRACT

Autonomous driving system methods and devices which trigger vehicular actions based on the monitoring of one or more occupants of a vehicle are presented. The methods, and corresponding devices, may include identifying a plurality of features in a plurality of subsets of image data detailing the one or more occupants; tracking changes over time of the plurality of features over the plurality of subsets of image data; determining a state, from a plurality of states, of the one or more occupants based on the tracked changes; and triggering the vehicular action based on the determined state.

23 Claims, 15 Drawing Sheets

(51) Int. Cl.
*G06V 10/764* (2022.01)
*G06V 10/82* (2022.01)
*G06V 20/40* (2022.01)
*G06V 20/58* (2022.01)
*G06V 20/59* (2022.01)

1302 — Identifying a plurality of features in a plurality of subsets of image data detailing the one or more occupants 1304 — Tracking changes over time of the plurality of features over the plurality of subsets of image data 1306 — Determining a state, from a plurality of states, of the one or more occupants based on the tracked changes 1308 — Triggering the vehicular action based on the determined state

1402 — Detecting a plurality of objects in a series of video frames taken from video 1404 — Monitoring changes in the plurality objects across the series of video frames 1406 — Electing a condition, from a plurality of conditions, based on the monitored changes 1408 — Generating the instruction for the vehicle based on the elected condition

METHODS AND DEVICES FOR TRIGGERING VEHICULAR ACTIONS BASED ON PASSENGER ACTIONS

RELATED APPLICATIONS

This application is a continuation of U.S. patent application Ser. No. 16/830,312, filed on Mar. 26, 2020, which is incorporated by reference herein in its entirety.

TECHNICAL FIELD

Various aspects of this disclosure generally relate to autonomous driving systems.

BACKGROUND

Autonomous driving utilizes reliable driving control and safety systems that process data acquired at a vehicle. Using data acquired at the vehicle, which may include data about the vehicle's external environment, internal environment, or data about the vehicle itself, the vehicle may alter its movements, modify its positioning with respect to external elements, and/or respond to newly detected events. Additionally, autonomous vehicles may be configured to communicate with other devices, such as other vehicles, network infrastructure elements, wireless devices, etc., to assist in the mobility control, provide faster information processing, and, generally speaking, communicate information in order to improve overall system performance.

Autonomous driving systems may also rely on driving models for safety assurance and compliance with local rules or regulations. Implementation of these driving models may allow autonomous vehicles to diagnose dangerous or unsafe situations and react to them accordingly.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 13 shows an exemplary flowchart for triggering a vehicular action based on monitoring one or more occupants of a vehicle according to some aspects.

FIG. 14 shows another exemplary flowchart describing a method to generate an instruction for a vehicle according to some aspects.

DESCRIPTION

Figure 1:
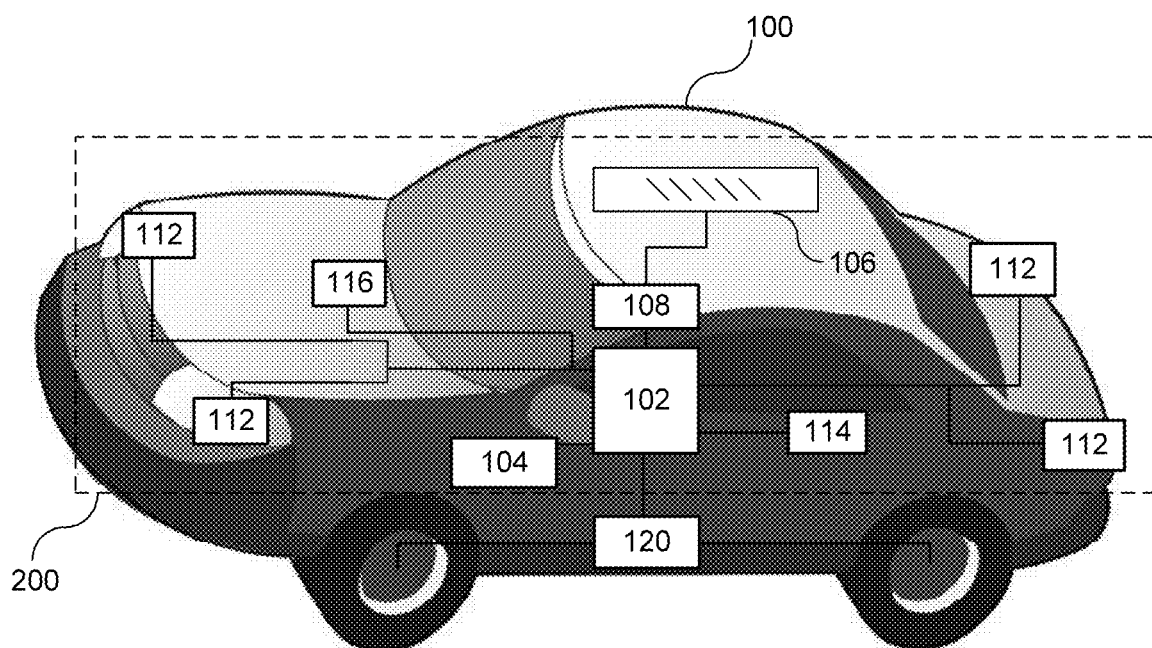
FIG. 1 shows an exemplary autonomous vehicle in accordance with various aspects of the present disclosure.

Safety assurance of autonomous vehicles may be achieved by implementing driving models which mimic "good driving habits" to quickly and effectively navigate and respond to situations. These driving habits may include, for example, maintaining a safe distance from other vehicles in the environment, e.g., a vehicle in front.

The following methods and devices use in-vehicle passenger monitoring data which is captured with a one or more in-vehicle data acquisition devices (e.g. a camera providing RGB, depth, and/or infrared data) and apply a spatio-temporal analysis modeling scheme to trigger vehicular actions. These methods and devices provide accurate and quick mechanisms to recognize a driver's state, for example, in order to take precautionary measures, such as providing an appropriate distance from a vehicle located in front or providing a notification to the driver of the vehicle. Each recognized state may be associated with a corresponding time value which reflects the driver's reaction time. Based on this time value, a theoretical safe distance to any externally detected objects (e.g. other vehicles) may be calculated and the appropriate vehicular action may be triggered.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body, is dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
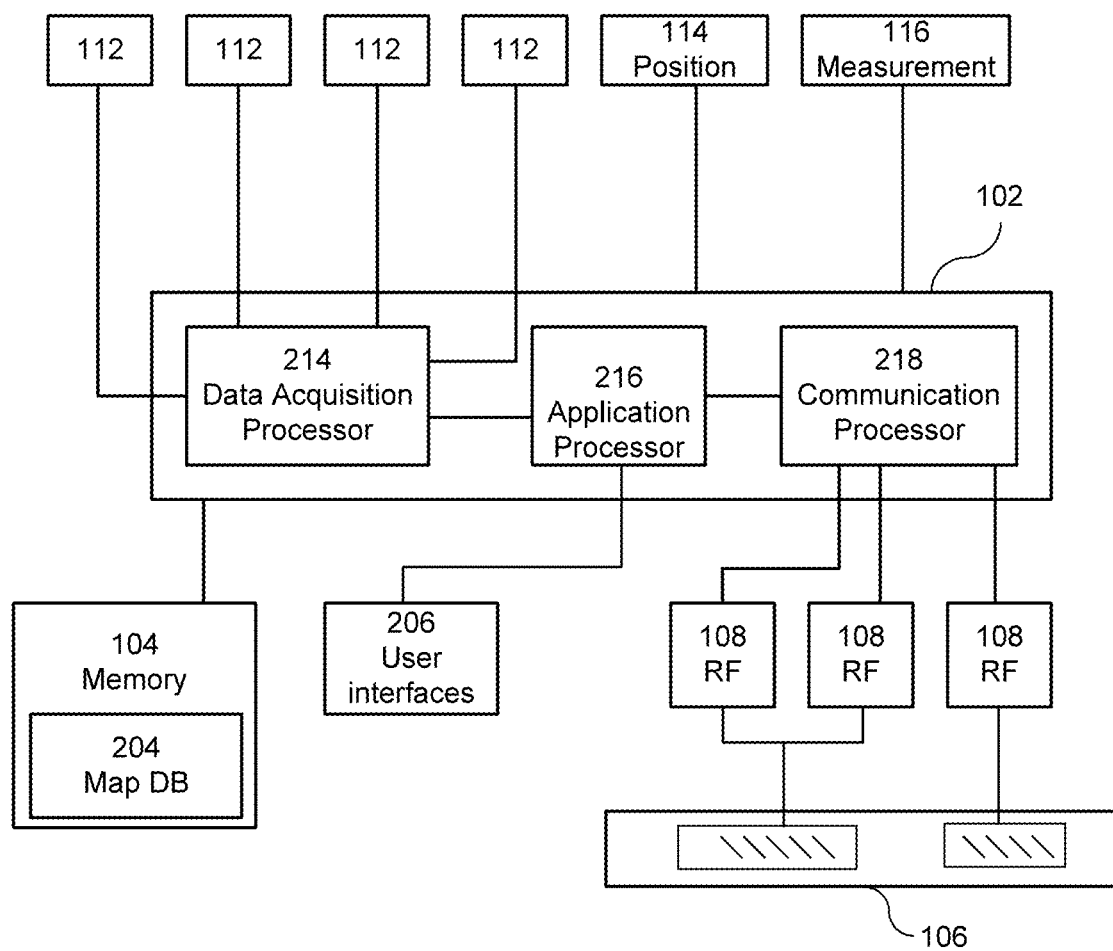
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, CPU, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 214 may include processing circuitry, such as a CPU, for processing data acquired by data acquisition units 112. For example, if one or more data acquisition units are image acquisition units, e.g. one or more cameras, then the data acquisition processor may include image processors for processing image data using the information obtained from the image acquisition units as an input. The data acquisition processor 214 may therefore be configured to create voxel maps detailing the surrounding of the vehicle 100 based on the data input from the data acquisition units 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), one or more user interfaces (UIs) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc.

In the transmit path, communication processor 218 may therefore receive and process outgoing data provided by application processor 216 according to the layer-specific functions of the protocol stack, and provide the resulting data to other components, such as one or more RF transceivers 108. Communication processor 218 may also perform physical layer processing to produce digital baseband samples, which it may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer and/or protocol layer stack processing on the digital baseband samples and provide the resulting data to other processors of the one or more processors 102, e.g., application processor 216. Application processor 216 may then handle the incoming data at the application layer, which can include execution of one or more application programs with the data and/or presentation of the data to a user via one or more UIs 206. One or more UIs 206 may include one or more screens, microphones, mice, touchpads, keyboards, or any other interface providing a mechanism for user input and/or providing information to a user (e.g., notifications to the user). Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

Data acquisition devices 112 may include any number of data acquisition devices and components depending on the requirements of a particular application. This may include: image acquisition devices, proximity detectors, acoustic sensors, infrared sensors, piezoelectric sensors, etc., for providing data about the vehicle's environment (both outside and inside the vehicle). Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

One or more position devices 114 may include components for determining a position of the vehicle 100. For example, this may include global position system (GPS) or global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as one or more GPS coordinates, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an electronic control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

Figure 3:
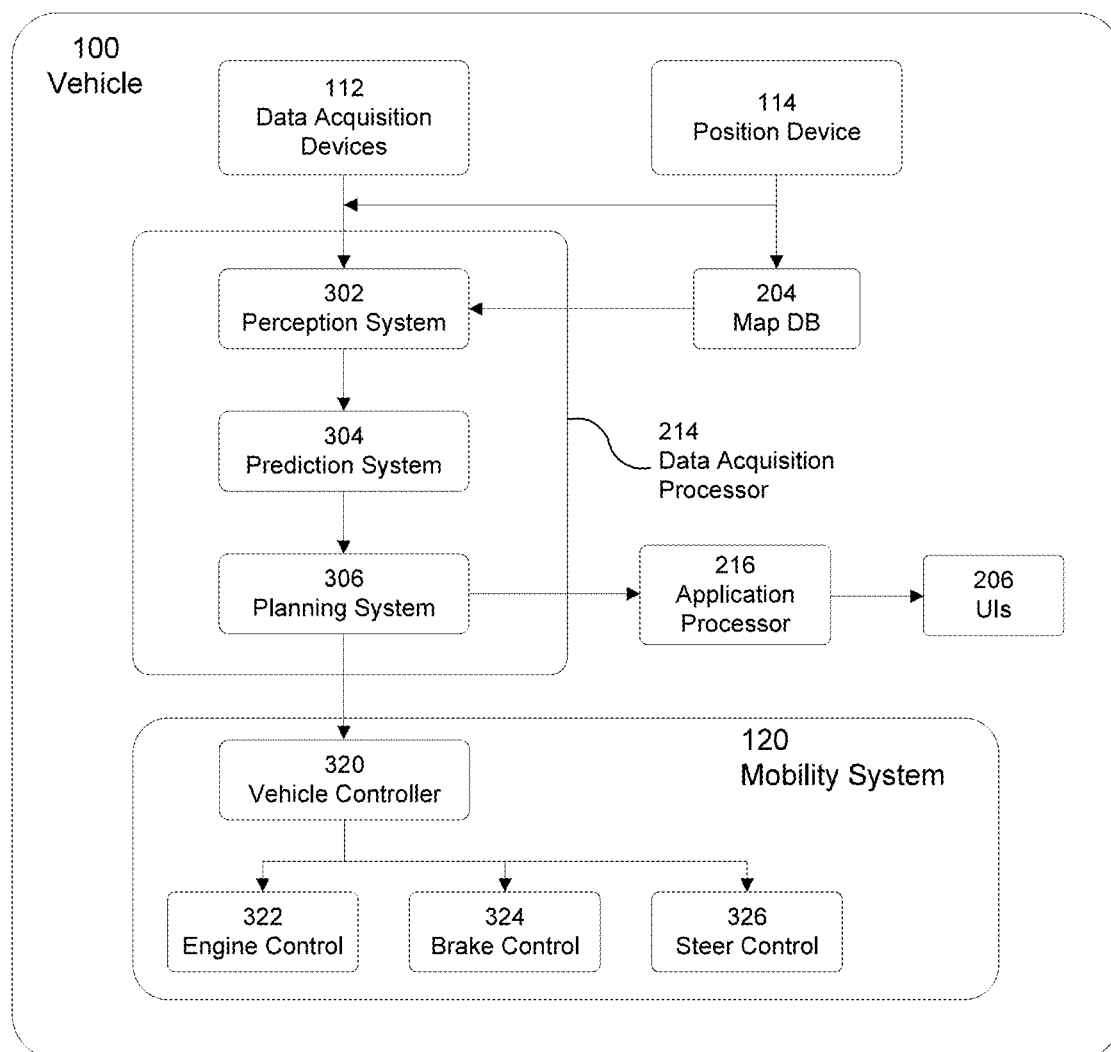
FIG. 3 shows an exemplary diagram of a vehicle according to some aspects.

FIG. 3 shows an exemplary block diagram 300 of a vehicle 100 in greater detail with respect to several components according to some aspects. Vehicle 100 may be capable of sensing its environment and/or sense changes inside the vehicle and navigate without direct human input and/or provide notifications to occupants of the vehicle.

The one or more data acquisition processors 214 may include a perception system 302, a prediction system 304, and a planning system 306 that cooperate to perceive the external (i.e., outside of the vehicle) and/or internal (i.e., inside of the vehicle) environment of vehicle 100 and determine a plan for controlling the mobility or positioning of vehicle 100 and/or issue notifications to one or more occupants.

The perception system 302 can receive data from the one or more data acquisition devices 112 that are coupled to or otherwise included within the vehicle 100. As examples, the one or more data acquisition devices 112 may include one or more cameras to provide data in one or more modalities (e.g., color, infrared, depth, etc.), a LIDAR system, a radar system, and/or other data acquisition devices. The data can include information that describes the location of objects within the surrounding and/or internal environment of vehicle 100.

For example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

The one or more position devices 114 may be any device or circuitry for determining the position of vehicle 100 (e.g., GPS, GNSS, triangulation methods with respect to terrestrial communication devices, etc.) and provide information to map DB 204 and/or perception system 302.

The data acquisition devices 112 and position devices 114 may therefore be used to collect data that includes information that describes the location (e.g., in three-dimensional space relative to vehicle 100) of points that correspond to objects within the surrounding and/or internal environment of vehicle 100.

In addition to the data from one or more data acquisition devices 112, the perception system 302 may retrieve or otherwise obtain map data from the map DB 204 that provides detailed information about the surrounding environment of the vehicle 100. The map DB 204 data may provide information regarding: the identity and location of different travel paths (e.g., roadways), road segments, buildings, or other items or objects (e.g., street lights, crosswalks, etc.); the location and directions of traffic lanes (e.g., the location and direction of a parking lane, a turning lane, a bicycle lane, or other lanes within a particular road); traffic control data (e.g., the location and instructions of signage, traffic lights, or other traffic control devices); and/or any other map data that provides information that assists the one or more processors 102 of vehicle 100 in monitoring and communicating with its external and/or internal environment.

The perception system 302 may identify one or more objects/features that may affect the control of vehicle 100 based on data received from the one or more one or more data acquisition devices 112 and/or the map DB 204. For example, according to some aspects, the perception system 302 may monitor an internal environment of the vehicle 100 and determine, for each object/feature, state data that describes a current state of such object as described. As examples, the state data for each object may describe an estimate of the object's: current location or position; current speed or velocity; current acceleration; current heading; current orientation; size/footprint (e.g., as represented by a bounding shape such as a bounding polygon or polyhedron); yaw rate; and/or other state information. According to some aspects, the perception system 302 may determine state data for each object/feature over a number of iterations and/or frames. In particular, the perception system 302 may update the state data for each object at each iteration or frame. Thus, the perception system 302 may detect and track objects and/or features (e.g., external to the vehicle such as other vehicles, internal to the vehicle such as people, etc.) over time. The perception system 302 may implement one or more machine learning models in order to perform these tasks.

The prediction system 304 may receive the state data from the perception system 302 and predict one or more future locations for each object based on such state data. For example, the prediction system 304 may predict where each object will be located within the next 1 second, 2 seconds, 10 seconds, etc. For example, an object may be predicted to adhere to its current trajectory according to its current velocity and/or acceleration. However, other more sophisticated prediction techniques or modeling may be implemented.

The planning system 306 may determine one or more plans for the vehicle 100 based at least in part on the perceived and/or predicted one or more future locations for the object and/or the state data for the object provided by the perception system 302 or prediction system 304. In other words, given information about the current locations of perceived objects and/or predicted future locations of the perceived objects, the planning system 306 may determine a plan for the vehicle 100 that best responds to or navigates the vehicle 100 relative to the objects at their current and/or future locations.

The planning system 306 may provide a plan to a vehicle controller 320 of the mobility system 120 that controls one or more vehicle controls such as Engine Control 322, Brake Control 324, and/or Steer Control 326 to execute the plan. The vehicle controller 320 may generate one or more vehicle control signals for the autonomous vehicle based at least in part on an output of the planning system 306. The planning system 306 may additionally or alternatively provide a notification to the Application Processor 216 to communicate via one or more UIs 206.

Each of the perception system 302, the prediction system 304, the planning system 306, and the vehicle controller 320 may include computer logic utilized to provide the desired functionality as discussed herein. According to some aspects, each of the perception system 302, the prediction system 304, the planning system 306, and the vehicle controller 320 may be implemented in hardware, firmware, and/or software controlling a general-purpose processor. For example, according to some aspects, each of the perception system 302, the prediction system 304, the planning system 306, and the vehicle controller 320 may include program instructions or files stored on a storage device, loaded into a memory and executed by one or more processors. In other aspects, each of the perception system 302, the prediction system 304, the planning system 306, and the vehicle controller 320 may include one or more sets of computer-executable instructions that are stored in a non-transitory computer-readable storage medium.

In various implementations, one or more of perception system 302, the prediction system 304, and/or the planning system 306 can include, or otherwise leverage, one or more machine learning models such as, for example, convolutional neural networks.

Figure 4:
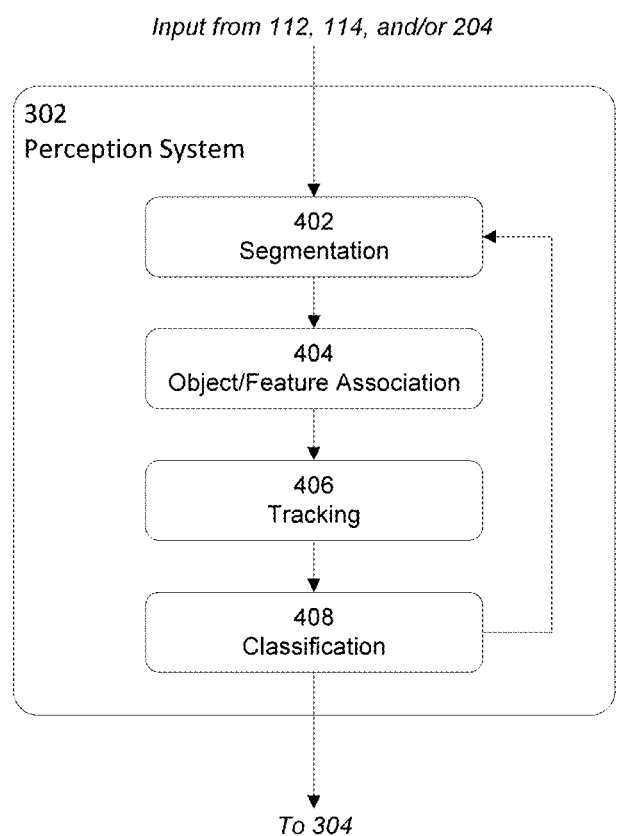
FIG. 4 shows an exemplary diagram of a perception system according to some aspects.

FIG. 4 shows an exemplary block diagram 400 providing further details of perception system 302 according to some aspects. As discussed in FIG. 3, one or more processors 102 in the data acquisition processor 214 may include a perception system 302 that may identify and/or track one or more objects and/or features (either in an external environment or internal environment) that may affect vehicle 100.

According to some aspects, the perception system 302 may include a segmentation component 402, an object/feature association component 404, a tracking component 406, and a classification component 408. The perception system 302 may receive data from one or more data acquisition devices 112, one or more position devices 114, and/or map data from map DB 204 as input. The perception system 302 may use these inputs in determining objects and/or behaviors of different objects in the external and/or internal environment to the vehicle 100. According to some aspects, the perception system 302 may iteratively processes the input data to detect, track, and classify objects identified from the input data.

The segmentation component 402 may process the received input data to determine potential objects and/or features within the external and/or internal environment, for example, using one or more object detection systems. The object/feature association component 404 may receive data about the determined objects and/or features and analyze prior object/feature instance data to determine a most likely association of each determined object/feature with a prior object/feature instance, or in some cases, determine if the potential object/feature is a new object/feature instance. The tracking component 406 may determine the current state of each object/feature instance, for example, in terms of its current position, velocity, acceleration, heading, orientation, uncertainties, and/or the like. The tracking component 406 may be further configured to track a change in state of an object/feature over time, e.g., over multiple video frames provided by one or more cameras. The classification component 408 may receive the data from tracking component 406 and classify each of the object/feature instances. For example, classification component 408 may classify a tracked object/feature as an object/feature from a predetermined set of objects/features and actions taken based on the tracked objects/features, e.g., driver in alert position, driver texting, etc. Classification component 408 may also provide feedback for the training of the segmentation component 402.

Perception system 302 may provide the object/feature and state data for use by various other systems within vehicle 100, such as prediction system 304.

Figure 5A:
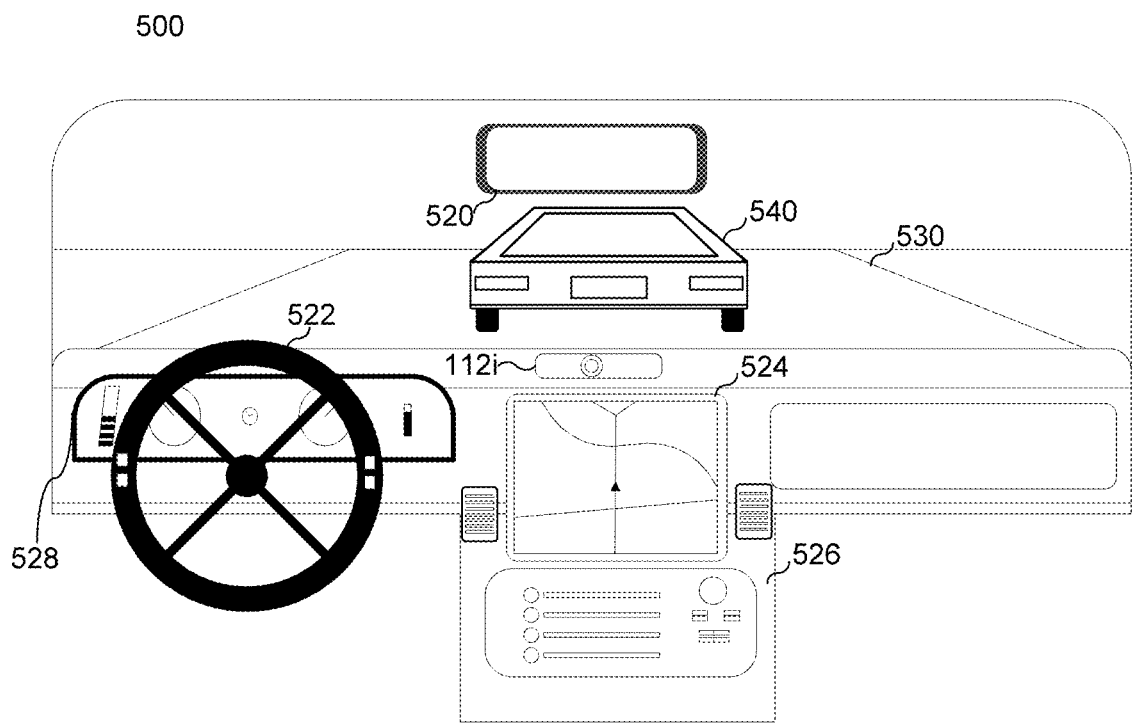
FIGS. 5A-5B show an exemplary internal vehicle setup and a block diagram for one or more in-vehicle sensors according to some aspects.
Figure 5B:
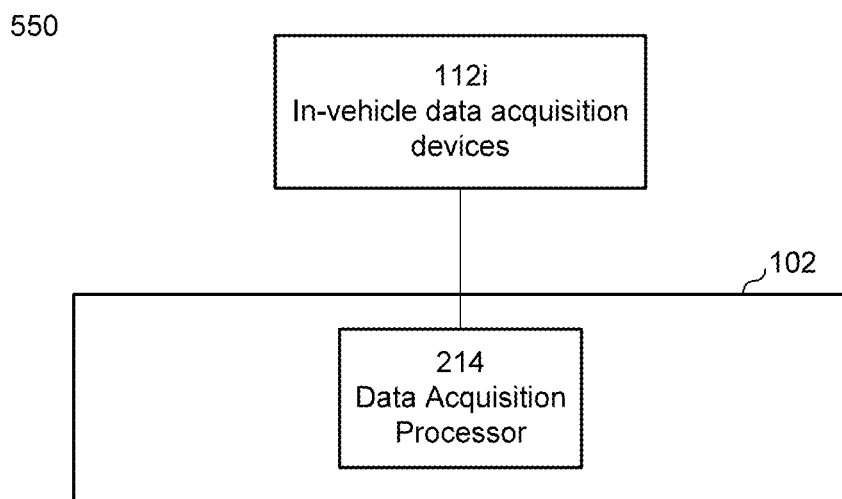

FIG. 5A shows an exemplary internal vehicle setup and driver view 500 and FIG. 5B shows an exemplary block diagram 550 for one or more in-vehicle data acquisition devices 112i according to some aspects.

As shown in FIG. 5A, the internal vehicle setup may include one or more internal data acquisition devices 112i. Although shown as being a singular unit placed in a particular location in 500, it is appreciated that in-vehicle data acquisition devices 112i may be alternatively and/or additionally placed at various other locations, such as rear view mirror 520, steering wheel 522, front-side display monitor 524, center console 526, dashboard 528, etc. In-vehicle data acquisition device(s) 112i may be one or more of an internal sensor(s) and/or camera(s). The view from a driver's perspective may further include the external environment, such as a forward-facing external environment including road 530 and a front vehicle 540.

FIG. 5B shows an additional interface which may be included into the control system 200 shown in FIG. 2, including one or more in-vehicle data acquisition devices 112i which may be included in the set of one or more data acquisition devices 112. One or more in-vehicle data acquisition devices 112i may be similar to those described with respect to 112 and provide data about the inside (i.e., internal environment) of vehicle 100, e.g., provide data about a driver's and/or passenger's actions. For example, the one or more in-vehicle data acquisition devices 112i may include a camera which is configured to provide one or more of a color (i.e., RGB), depth, and/or infrared data.

Figure 6:
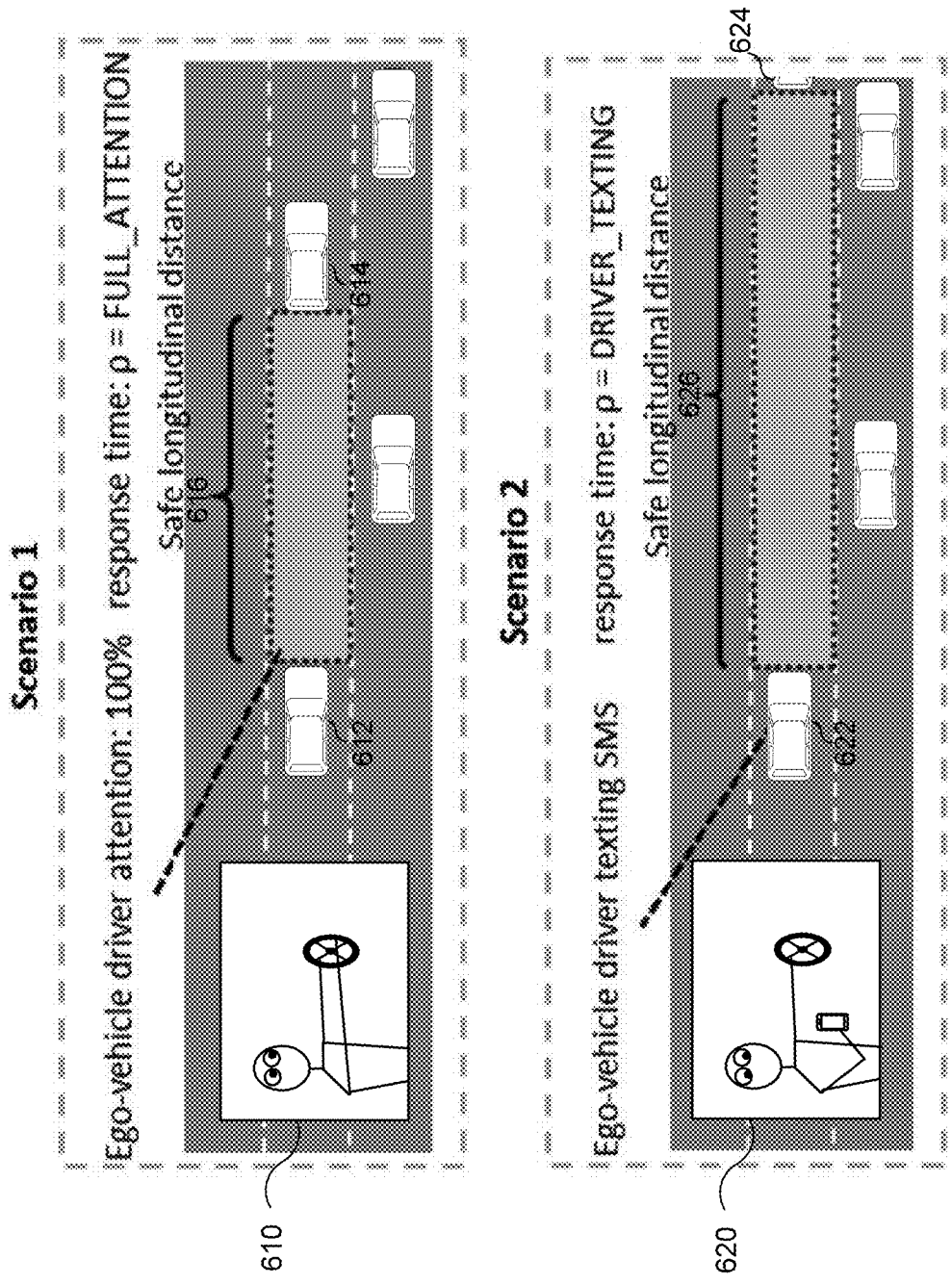
FIG. 6 shows exemplary scenarios exhibiting driver behavior and longitudinal distances to a front vehicle according to some aspects.

FIG. 6 shows two exemplary scenarios illustrating a monitoring of a driver and the associated longitudinal distance to a front vehicle according to aspects.

In Scenario 1, the driver is at attention as shown by the video frame in 610. Since the driver is at full attention, it can be assumed that the driver's response time (i.e., reaction time) corresponds to a time of being at full attention, i.e., the driver may have the quickest reaction time in this state. Accordingly, the distance 616 between the vehicle 612 and a front vehicle 614 may be adjusted accordingly.

In Scenario 2, the driver is texting as shown by the video frame in 620. Since the driver's attention is not fully on driving, it can be assumed that the driver's response time (i.e., reaction time) may be less than that in Scenario 1, i.e., the driver may have a slower reaction time. Accordingly, the distance 626 between the vehicle 622 and the front vehicle 624 may be adjusted accordingly. As shown, the distance 626 in Scenario 2 is greater than the distance 616 in Scenario 1.

Figure 7:
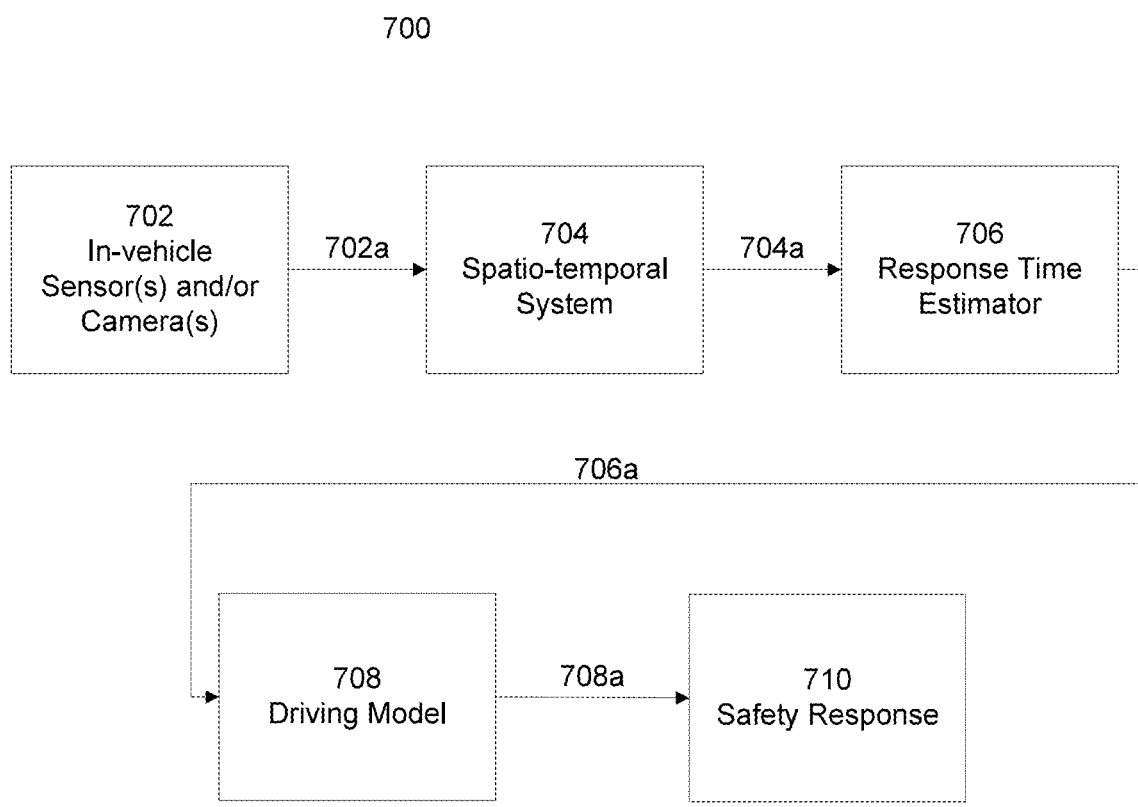
FIG. 7 shows an exemplary diagram illustrating a driving safety system based on monitoring one or more occupants of a vehicle according to some aspects.

FIG. 7 shows an exemplary block diagram 700 illustrating characteristics of a driving model according to several aspects.

In 702, one or more in-vehicle sensors and/or cameras acquire data about the inside of a vehicle. This may, for example, include acquiring image data about the one or more passengers of the vehicle, such as taking video of the driver of the vehicle. The data acquired by the one or more in-vehicle sensors and/or cameras in block 702 may correspond to, for example, data being acquired by one or more in-vehicle data acquisition devices 112i.

The output 702a of the one or more in-vehicle sensor(s) and/or camera(s) may be fed to a spatio-temporal system 704, which may be included in the perception system 302 of one or more data acquisition processors 214. Output 702a may be, for example, video frames with color (i.e., RGB) and/or depth modalities. Spatio-temporal system 704 may be configured to monitor one or more passengers based on the output 702a of the one or more in-vehicle sensors and/or camera(s) 702. This may include identifying features and/or objects from output 702a, e.g., identifying feature and/or objects in video frames sampled from video data, and tracking the identified features and/or objects over time, e.g., tracking the changes in the features and/or objects over a plurality of video frames.

The output 704a from spatio-temporal system 704 may include an action recognition output based on the identifying and tracking of the features/objects of spatio-temporal system 704. For example, this may include recognizing a driver state (i.e., driver condition, driver class) such as "paying attention," "texting," "drinking," "looking at the mirror" or "looking at the radio," etc. Output 704a may be fed to the Response Time Estimator 706, which max be configured to determine a response time based on the output 704a. Response Time Estimator 706 may be included in prediction system 304 and produce an output 706a with a time value based on the input received from spatio-temporal System 704.

Driving Model 708 may receive the output 706a from Response Time Estimator 706 and produce an output 708a to trigger a Safety Response 710. Driving Model 708 may be included in planning system 306 and may calculate a theoretical distance based on a response time from Response time Estimator 706 and also may calculate an actual distance from an external object (e.g., a vehicle in front, vehicle in neighboring lane, etc.). Driving Model 708 may compare the theoretical distance and the actual distance include this comparison in output 708a. Based on the output 708a, the Safety Response 710 may be implemented by, for example, vehicle controller 320 or by one or more UIs 206. Safety Response 710 may include modifying one or more of an acceleration, braking, and/or steering of the vehicle or communicating one or more notifications via the UIs.

According to some aspects, block diagram 700 describes an approach for spatio-temporal (ST) understanding of a driver's state to estimate the driver reaction time based on in-vehicle video data analysis The estimated driver reaction time may then be used in a driving model to enable the identification of emerging dangerous situations due to lack of driver attention.

Figure 8:
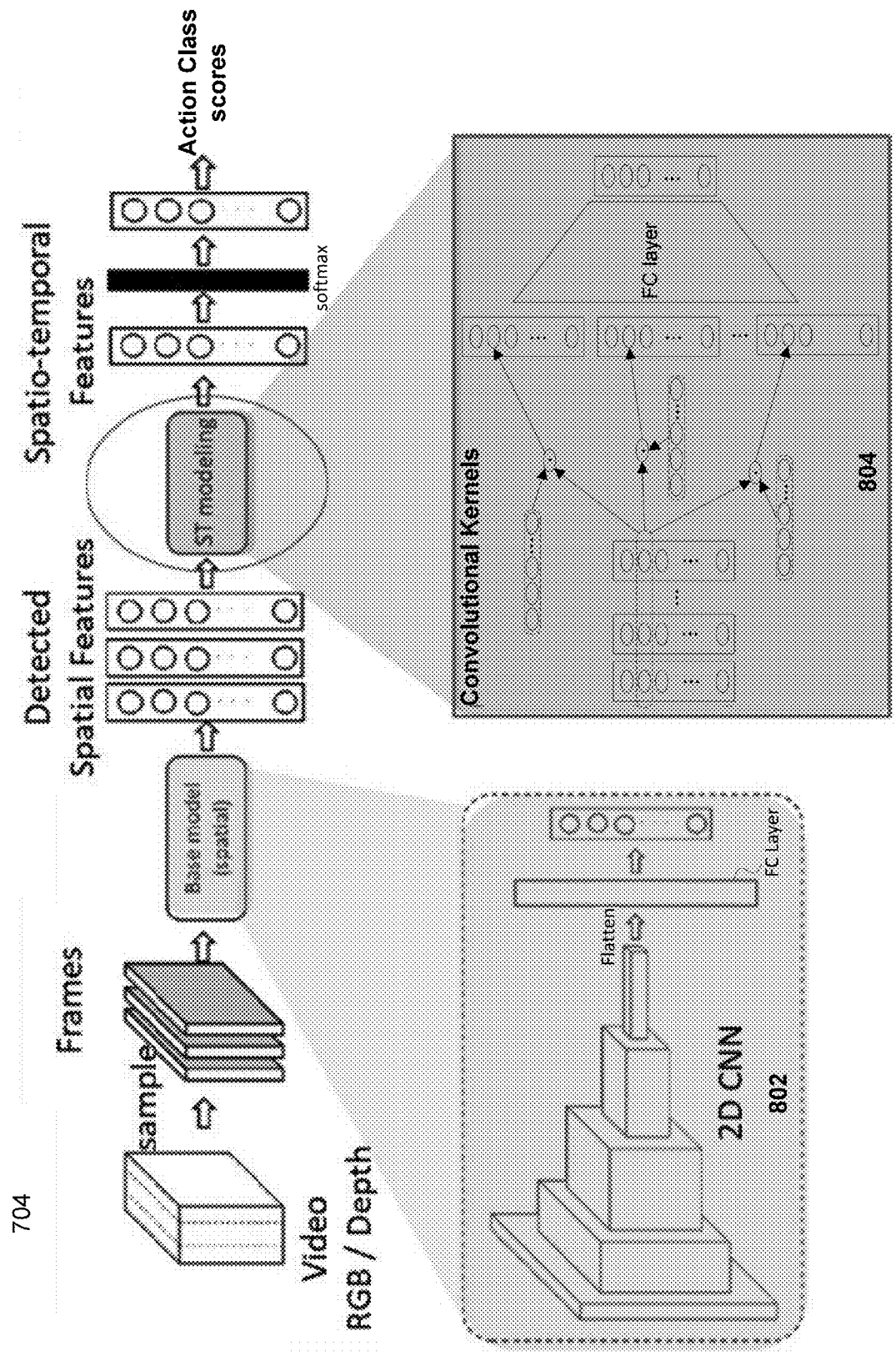
FIG. 8 shows an exemplary diagram of a spatio-temporal monitoring system according to some aspects.

FIG. 8 shows an exemplary diagram illustrating components of the spatio-temporal (ST) system 704 according to some aspects. ST system 704 employs a Feature-Level Temporal Filtering (FTF) based modeling technique providing greater accuracy in determining a driver's actions, and thereby, allows for classification of the driver's state for safety purposes.

The FTF based modeling technique described herein may identify and extract features and/or objects with a two-dimensional (2D) convolutional neural network (CNN) 802 using subsets of data, e.g., video frames, taken from a larger set of data, e.g., video, as an input. 2D CNN 802 may include a group of connected nodes, which may also be referred to as neurons or perceptrons and may include an input layer, an output layer, and one or more hidden layers between the input and output layers. 2D CNN 802 may be a deep, feed-forward neural network with convolutional layers as the hidden layers. 2D CNN 802 may include tens of layers of node, hundreds of layers of nodes, etc. Each convolutional layer may perform convolutions of data input to it using learned filters, which may be referred to as kernels. 2D CNN 802, accordingly, may be trained to identify particular features and/or objects in images by analyzing the images using pre-trained models. 2D CNN extractor 802 may be a pre-trained model which is trained to identify specified features and/or objects in each of the frames. The outputs of the pre-trained model may include, for example, features/objects such as a hand, a bottle, a cellphone, a person holding the steering wheel with both hands, a profile of a face, the back of a person's head, etc. 2D CNN 802 may be configured to be further trained based on the feedback from the results produced by ST system 704.

Figure 8A:
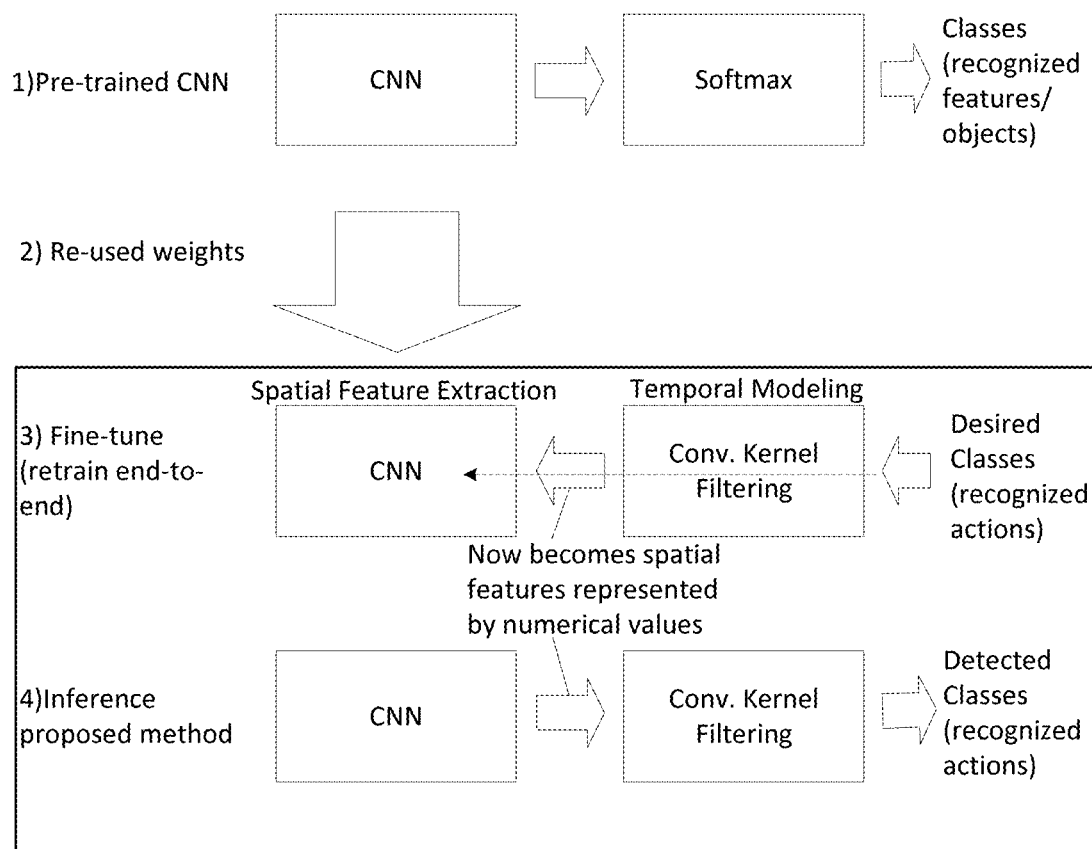
FIG. 8A shows an exemplary illustration of a training process for a 2D CNN according to some aspects.

2D CNN 802 may be a base model that identifies and extracts spatial features and/or objects from frames of a video which may include color and/or depth modalities. The video may be acquired at one or more in-vehicle sensors and/or cameras and may be sampled at a rate of about 20 to about 120 frames per second (fps) for a duration of about 1 to about 4 seconds to provide number of sampled frames ranging from 2 to 32, e.g., from 4 to 16. It is appreciated that these values are exemplary in nature and other values may be used, e.g., other sampling rates and/or durations. For example, a sampling rate of 30 fps for a duration of about 1.67 seconds may be used on the video data from the one or more data acquisition devices, where the video data may be in the form of a video clips of 20-200 frames, e.g., on average about 50 frames. A number of these frames may be selected so the ST system 704 may track changes in the features and/or objects over the frames, i.e., at least over two or more frames, which may provide information about the change in the features and/or objects over time. Accordingly, 2D CNN 802 may be configured to receive a plurality of subsets of image data (e.g., frames from video) and identify point locations in each of the plurality of subsets of image data to use as inputs to 2D CNN 802 for feature and/or object extraction. The initial output of the 2D CNN 802 may therefore be pre-trained to detect objects/features, and then, using the pre-trained model, it may be re-trained end-to-end with information from the temporal filtering aspect obtained from 804. This may change the output of the 2D CNN 802 to, instead of representing the probability of the pre-trained classes, to become a "set of features" represented by values for the new desired action classes. FIG. 8A shows an exemplary illustration of this process and highlights 3) and 4) representing the re-training according to aspects of this disclosure.

Once 2D CNN 802 has performed the convolutions on the inputs and applied a fully connected (FC) layer to identify and extract values for the set of features and/or objects in each of the frames, it may output a series of segments, i.e. columns shown under "Detected Spatial Features" in FIG. 8. Each of the segments may include a series of entries, with each entry having a value ranging from a minimum to a maximum. Each entry may correspond to a feature and/or object and the value of the entry may correspond to the "magnitude" of that feature and/or object in the given frame. So, for example, the first entry in each of the segments may correspond to a first pre-trained feature and/or object which the 2D CNN is trained to recognize, and each first entry in the segments may have a value that corresponds to the "strength" of that feature and/or object in that particular segment (i.e., corresponding frame). For example, the minimum value may be a zero, which indicates that the given feature and/or object is not identified in the segment. An increase in the value towards the maximum of the range indicates that the object and/or feature is more apparent, i.e., is more readily observable or more prevalent, in the given segment.

The temporal aspect of ST model 704 is shown in temporal filtering section 804. The temporal filtering section of ST model 804 may apply convolutional kernels to the series of segments of the "Detected Spatial Features" to identify which features and/or objects are "emerging" (i.e., becoming more apparent or increasing in strength) and which features are "vanishing" (i.e., becoming less readily observable or becoming weaker). A SoftMax layer is applied to the Spatio-temporal features output of 804, which may be in the form of a vector of $N_C$ values (where $N_C$ is the number of classes). The SoftMax layer may normalize this vector into a probability distribution vector consisting of $N_C$ probabilities proportional to the exponentials of the vector input to this SoftMax layer. Each of the classes of the vector (i.e., each $N_C$) is provided as a value, or "Action Score," indicating the determined class based on the input. This class may correspond to a status of the driver.

According to some aspects, the ST system 704 applies a feature/object level filter-based technique to (1) identify and extract features and/or objects from selected frames of an action video in 802, and (2) track changes in these features and/or objects over the selected frames, i.e., over time, in 804. This helps to capture the temporal information between selected frames using values of feature and, therefore, makes it possible to understand a direction of a motion together with the magnitude of change. Since the order and magnitude of change of a motion may be very critical in differentiating specific actions (e.g. differentiating thumbs up versus thumbs down), the mechanisms and schemes provided herein are provide high accuracy and efficiency in identifying a state of a driver and/or passengers, for example, and using this information for a safety driving model.

Figure 9:
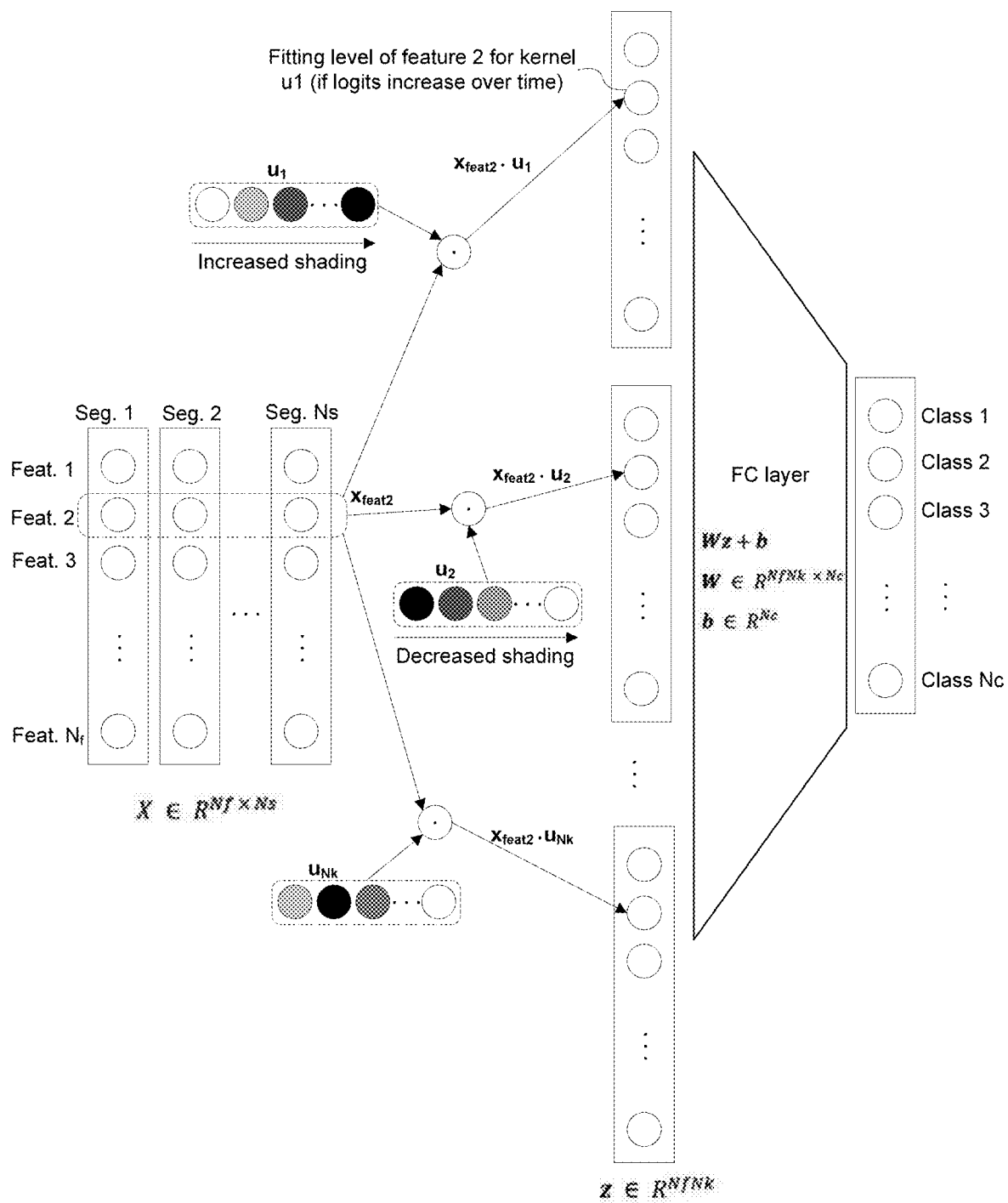
FIG. 9 shows an exemplary diagram of a feature tracking aspect of a spatio-temporal monitoring system according to some aspects.

FIG. 9 shows an exemplary diagram detailing the temporal filtering feature 804 of the ST model according to some aspects.

The temporal filtering aspect of the ST model of this disclosure introduces the ability to track the changes of features and/or objects across time (i.e., across frames) due to motion instead of using an absolute value of each feature at each frame individually. The order and magnitude of the tracked changes of the identified feature and/or objects provide for improved accuracy and efficiency in identifying different situations.

For example, two hand gestures "thumbs up" (thumbs initially pointed downwards and then turned upwards) and "thumbs down" (thumbs initially pointed upwards and then turned downwards) may essentially have the same frames if the order of the frames is not revealed. One of the feature dimensions (i.e., entries) may specifically detect the static moment of a thumb pointing upwards, and another feature dimension may detect the static moment of a thumb pointing downwards. Detecting the feature of "thumbs up" may be facilitated if an increase in the feature of the "thumb pointing upward" and a decrease in the feature of the "thumb pointing downward" is detected across the sampled frames.

The temporal feature of the ST model uses several convolutional kernels to convert the absolute feature logits from the identified objects and/or features extracted from the 2D CN model to provide an indication of increasing or decreasing values. This, in turn, simplifies the FC layer by providing a number of kernels, $N_k$, less than the number of segments, $N_S$, i.e., $N_k < N_S$, with a reduction of the dimensions of the feature vector input to the FC layer.

The temporal filtering at the feature/object level is illustrated in greater detail in 804. With $N_k$ kernel vectors, the number of kernels, $u_k$, can be defined as $u_k \in R^{N_S}$, where k=1, 2, ..., Nk. The indicator sets are obtained by $v_k = X \cdot u_k$. All $v_k$ are concatenated to be $z \in R^{N_f N_k}$, and then it passes through the FC layer with weight $W \in R^{N_fN_k*N_c}$ and bias $b \in R^{N_c}$ to provide a vector containing values describing the "emergence" or "disappearance" of the features and/or object across the segments to use in determining action scores for each of the classes which identify the one or more passengers' action (e.g., if the driver is at full attention). The kernels and indicator sets can be written in matrix form:

$$U=(u_1 u_2 \ldots u_k) \in R^{N_s*N_k}$$

$$V=XU=(v_1 v_2 \ldots v_k) \in R^{N_f*N_k}$$

In FIG. 9, the tracking of feature 2 (i.e., Feat. 2) in the Detected Spatial Features segment set consisting of Seg. 1, Seg. 2, . . . Seg. $N_S$ is shown for exemplary purposes, where the number of segments, $N_S$, may correspond to the number of video frames. Each feature and/or object (i.e., Feat. 1 to Feat. $N_f$) may undergo a similar process in order to determine a class from the plurality of classes (Class 1, Class 2, Class 3, . . . , Class $N_c$), i.e., determine a state of the plurality of states of the one or more occupants.

For Feat. 2, kernel $u_1$ may identify the "emergence" of the feature (illustrated by the increased shading in the circles of u1). The dot product of $x_{feat2}$ and $u_1$ provides a fitting level for kernel $u_1$ if the logits increase over time and is included in the corresponding Feat. 2 entries of the indicator sets, which are then concatenated to $z \in R^{N_fN_k}$. Similarly, the dot product of the other kernels (i.e. $u_2$ to $u_{Nk}$) is applied to the values of Feat. 2 across all the segments (Seg. 1 to Seg. $N_S$). For example, kernel $u_2$ identifies that Feat. 2 is "vanishing" (illustrated by the decreased shading in the circles of u2) and applies the dot product of the kernel against Feat. 2 and includes the corresponding entry in the indicator set. By applying the kernels ($u_1$ to $u_{Nk}$) to all of the features (Feat. 1 to Feat. $N_f$) across the segments (Seg. 1 to Seg. $N_S$), a score value for each of the classes (Class 1 to Class $N_C$) may be generated. And, the class (i.e., state, condition) with the highest score may correspond to the determined class which is used to trigger the appropriate vehicular action.

By selecting $N_k < N_S$, the methods and devices described herein achieve improved performance when compared with current state-of-the-art approaches. In other words, the methods and devices described herein employ a smaller number of kernels and are still able to capture the dynamic changes in the identified features and/or objects, thus providing a trainable dimension reduction. The parameter size may be defined as $N_k(N_S+N_fN_C)$, which is not as entirely dependent on the number of segments ($N_S$) compared to previous approaches. This reduction in dimensions allows for the ability to train the neural networks with a smaller number of parameters, which provides for greater resource efficiency when compared to state-of-the-art approaches and thereby provides to be more reliable in critical real-world applications.

The FTF-based modeling techniques described herein have a higher classification accuracy in action recognition (shown in Tables 2 and 3) and can capture the direction and changes in the motion magnitude. The performance analysis with the FTF-based modeling techniques described herein was evaluated against several benchmarks. The results show that it outperforms current state-of-the-art approaches, especially in cases where the temporal information such as the order of frames of an action video or magnitude of change of motion provides signification information on the performed action and also in cases where the video needs to be analyzed instantaneously for a successful decision.

The approaches described herein also provide real-time performance for passenger action recognition (e.g., driver action recognition) as shown in FIG. 14. This is very crucial for safety critical problems and exceeds state-of-the-art approaches, even over those approaches using three-dimensional (3D) CNNs. The 2D CNN approach of this disclosure may enable CPU-only deployment as opposed to only being able to be deployed with more complex GPUs.

Table 1 shows 13 exemplary classes (i.e., states) which may be identified according to the FTF-based modeling techniques described herein along with their corresponding reaction times ($\rho$). It is appreciated that Table 1 is exemplary in nature and any other number of classes may be used. For example, less than or greater than 13 classes may be included in the plurality of classes $N_c$ (i.e., plurality of states). Other classes may also include, for example: eating, shaving, etc. and each may have a corresponding reaction time.

TABLE 1

| Exemplary list of classes (i.e. states) and corresponding reaction time values | | | | | | | | | | | | | |
|---|---|---|---|---|---|---|---|---|---|---|---|---|---|
| Index | 1 | 2 | 3 | 4 | 5 | 6 | 7 | 8 | 9 | 10 | 11 | 12 | 13 |
| Class | Drive both hands | Switch gear | Talk to passenger | Adjust Radio | Drink | Call left hand | Call right hand | Hair makeup | Reach side | Reach behind | Text left hand | Text right hand | Hands free |
| Reaction time | 2.0 sec | 2.1 sec | 2.4 sec | 3 sec | 3 sec | 3.2 sec | 3.2 sec | 3.5 sec | 4 sec | 4 sec | 4.2 sec | 4.2 sec | 5 sec |

For each class of the list of recognized classes, an estimate of the driver reaction time is specified statically with an annotation. The static annotation assigned a fixed number value for each class corresponding to plausible values, e.g., humans take on average 2 seconds to react to external events when focused.

At runtime, the in-vehicle monitoring may report the most likely recognized driver class based on the ST modeling techniques described herein and the estimated driver reaction time ($\rho$) can be obtained by using a look-up table as shown in Table 1. So, referring back to FIG. 3, the perception system 302 may employ the ST model shown in FIGS. 7-8, and the prediction system 304 may estimate the response time and forward the response time to a driving model, which may be included as part of planning system 306. The driving model may then use the selected reaction time and implement it into an algorithm for the detection of dangerous situations. This may include the detection of a violation of a safe longitudinal distance ($d_{min}$) from a vehicle in front or a safe distance from vehicle in neighboring traffic lanes. For example, for the case of determining a safe longitudinal distance ($d_{min}$) based on the determined driver state, the following equation may be used:

$$d_{min} = \left[ v_r \rho + \frac{1}{2} a_{max,accel} \rho^2 + \frac{(v_r + \rho a_{max,accel})^2}{3 a_{min,brake}} - \frac{v_f^2}{2 a_{max,brake}} \right]_+$$

where $v_r$ is the velocity of the ego-vehicle, $\rho$ is the reaction time of the driver determined according to aspects of this disclosure, $a_{max,accel}$ is the maximum acceleration of the ego-vehicle, $a_{min,brake}$ is the minimum acceleration of the braking of the ego-vehicle, $v_f$ is the velocity of the vehicle in front, and $a_{max,brake}$ is the maximum acceleration of the braking of the vehicle in front. It is noted that the ego-vehicle is the vehicle which is implementing the aspects of this disclosure.

Once a theoretical safe distance (e.g., a safe longitudinal distance such as $d_{min}$) is calculated, it may be compared to an actual physical distance to one or more objects detected in the vehicle' external environment, e.g., a vehicle in front or in a lateral lane. The one or more external objects may be detected via one or more data acquisition devices (e.g., cameras, sensors) configured to monitor the vehicle's external environment. The physical distance to the one or more external objects may be calculated according to any number of methods, including image processing, LIDAR, radar, sonar, or the like.

This comparison of the theoretical safe distance and the actual physical distance to the one or more objects outside of the vehicle may trigger a vehicular action, which may be sent to other parts of the vehicle, such as vehicular controller 320 of mobility system 120 and/or the application processor 216 to send a notification to one or more passengers via one or more of the UIs 206, for example. This action may include, for example, the vehicle controller 320 sending a signal to brake control 324 to provide the appropriate braking response until the safe distance from a front vehicle is achieved based on the calculated safe distance and its comparison to the actual distance from the front vehicle.

Figure 10:
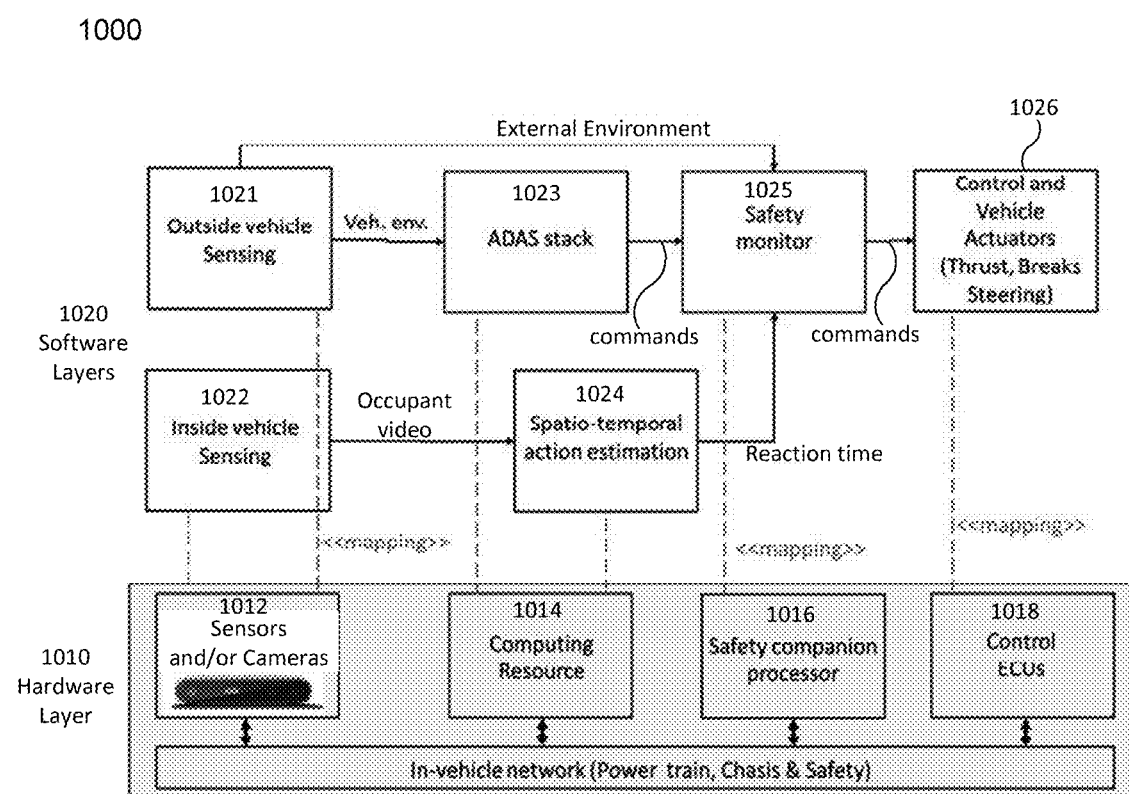
FIG. 10 shows an exemplary software and hardware layer diagram according to some aspects.

FIG. 10 shows an exemplary diagram 1000 describing the interactions between the various hardware layer 1010 and software layer 1020 components according to aspects of this disclosure.

It is appreciated that diagram 1000 contains features corresponding to other parts of this disclosure, e.g., Sensors and/or Cameras 1012 may correspond to 112 and/or 112*i*; Advanced Driver Assistance System (ADAS) stack 1023, Spatio-temporal action estimation 1024, and Safety Monitor 1025 may correspond to one or more of perception system 302, prediction system 304 or planning system 306, for example.

The hardware layer 1010 includes the sensor(s) and/or camera(s) 1012 which monitor both the in-vehicle environment (i.e., passenger compartment) and the external vehicle environment (i.e., outside of the vehicle) and are the physical components for the Outside Vehicle Sensing 1021 and Inside Vehicle Sensing 1022 software layers. Outside vehicle sensing 1021 provides the vehicle environment (Veh. env.) data to the ADAS stack 1023, while Inside vehicle sensing 1022 provides the Occupant video to Spatio-temporal action estimation 1024 (corresponding to FIGS. 8 and 9). Each of ADS stack 1023 and Spatio-temporal action estimation 1024 may be physically implemented on Computing Resource 1014 and provide their respective outputs to the Safety Monitor 1025, which in turn provides the command to the Control and Vehicle Actuators 1026 software layer on the Control ECUs 1018. Each of hardware components 1012-1018 may have interfaces to be included within In-vehicle network.

The FTF-based spatio-temporal modeling techniques according to aspects of this disclosure (e.g., as described in FIGS. 7-10) were evaluated against other conventional techniques. The same datasets and the same training settings were used in order to provide for an exact comparison.

A first round of tests was conducted using the FTF-based modeling technique of this disclosure and several types of 2D CNNs using publicly available datasets as base models. The other techniques include Multi-Layer Perceptron (MLP) based, Long-Short Term Memory (LSTM) based, and Averaging (AVG) based modeling techniques. All trainings were performed selecting the feature dimension as 27. The learning rate was initialized at 0.001 and divided by 10 at epoch 25 and 40 and finalized at epoch 60 for MLP, FTF, and LSTM based modeling techniques. For the AVG model, the learning rate was initialized at 0.01 and divided by 10 at epoch 25 and 40 and finalized at epoch 60.

The results provide evidence that since the FTF-based modeling techniques described herein are based on a spatio-temporal understanding of image data, they can be applied to any kind of action and gesture recognition problem. Table 2 provides the accuracy results using a publicly available dataset with several different architectures as base models. The results of the FTF-based modeling techniques are shown in bold.

TABLE 2

Accuracy results compared to other techniques

| Base Model | Segments | ST modeling method | Top-1 Acc. (%) | Top-5 Acc. (%) |
|---|---|---|---|---|
| Base Model #1 | 4 | MLP | 79.3 | 96.7 |
| | 4 | FTF | 82.1 | 97.3 |
| | 4 | LSTM | 9.9 | 24.4 |
| | 8 | MLP | 82.8 | 97.8 |
| | 8 | LSTM | 77.9 | 96.3 |
| | 8 | AVG | 72.3 | 97.3 |
| | 8 | FTF | 85.8 | 98.4 |
| | 16 | AVG | 74.0 | 97.6 |
| | 16 | LSTM | 79.5 | 96.6 |
| Base Model #2 | 4 | MLP | 83.9 | 98.1 |
| | 4 | FTF | 86.8 | 98.6 |
| | 4 | LSTM | 83.3 | 98.0 |
| | 4 | AVG | 77.3 | 98.0 |
| | 8 | FTF | 90.0 | 99.2 |
| | 16 | LSTM | 90.36 | 99.0 |
| | 16 | FTF | 90.44 | 99.3 |
| Base Model #3 | 8 | MLP | 88.3 | 99.1 |
| | 8 | LSTM | 89.7 | 99.1 |
| | 8 | FTF | 91.3 | 99.4 |
| Base Model #4 | 4 | AVG | 80.9 | 98.7 |
| | 4 | MLP | 86.8 | 98.7 |
| | 8 | AVG | 83.6 | 99.1 |
| | 8 | MLP | 88.7 | 99.1 |
| | 8 | FTF | 91.6 | 99.4 |

The FTF modeling technique described herein provide superior results compared with other known conventional techniques using several different architectures as base models for feature extraction. Table 2 shows that the FTF-based modeling techniques described herein provide a 3% accuracy boost in almost all the tested models and across all numbers of segments. This improvement confirms that how the features change matters as much, if not more, than the absolute values of the features. At lower complexity models, such as on Base Model #2 with 8 segments, the FTF-based modeling techniques can perform virtually at the same rate compared with the more complex base models #3 and #4. The FTF-based modeling techniques of this disclosure outperform MLP-based techniques by extracting the temporal changes from the cross-segment features set. Another advantage of the FTF-based techniques of this disclosure compared to MLP is that it relies on a smaller number of parameters, which allows it to be more resource efficient that MLP. The average number of frames per clip in the used public dataset is around 33. LSTM appears to not be an efficient manner for cross-segment consensus.

A second round of tests was performed using a driver behavior monitoring dataset collected with an Intel® RealSense™ camera (Note: Intel® and Intel® RealSense™ are trademarks of Intel Corporation and its subsidiaries) which provides data in three modalities: RGB, depth, and infrared. The performance of the FTF-based modeling techniques described herein were evaluated on RGB and depth modalities. The results are shown in Table 3.

TABLE 3

Accuracy on Driver Behavior Monitoring Dataset

| Modalities | Modeling Technique | # of features | Top-1 Acc. (%) | Top-5 Acc. (%) |
| --- | --- | --- | --- | --- |
| RGB | AVG | 13 | 87.9 | 98.8 |
|  | FTF | 64 | 89.3 | 99.2 |
| Depth | AVG | 13 | 91.9 | 98.7 |
|  | FTF | 64 | 93.3 | 99.1 |

The results of the FTF-based modeling techniques described herein were compared with the AVG technique. Since there are 13 actions in the base model dataset which was used, the number of features for AVG was set to 13, which is equal to the number of action classes. Sixty-four features were used for the FTF-based modeling technique.

Figure 11:
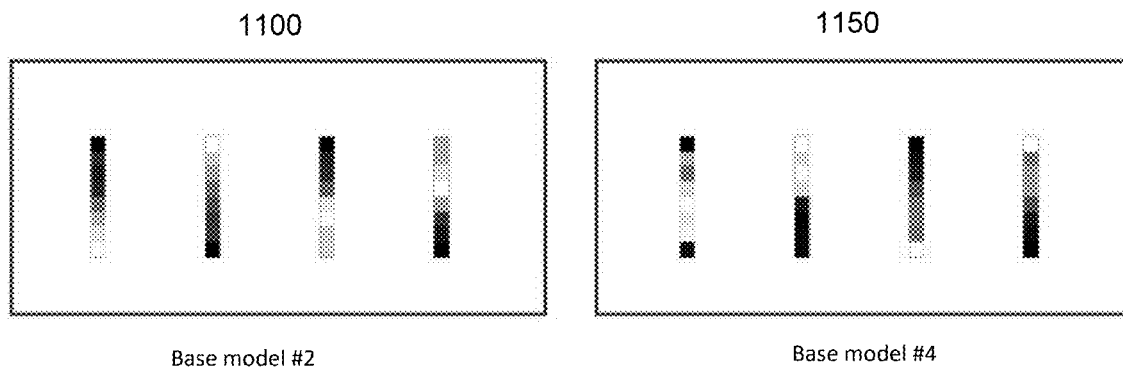
FIG. 11 shows visualizations of kernels using two base models according to some aspects.

FIG. 11 shows two visualizations 1100 and 1150 of FTF kernels using Base Model #2 and Base Model #4, respectively. The number of kernels ($N_k$) is equal to four, the number of segments ($N_S$) is equal to eight, and the feature dimension ($N_f$) is equal to 27. From the top to bottom, s represents segment 1 to segment $N_S$, i.e. $N_8$. In FIG. 11, lights shades represent higher weights. For the kernels of Base Model #2, the first and second kernels represent the emerging aspect and vanishing aspect of a feature, respectively. The last two kernels represent the focus around segment 6 and 4, respectively. For the kernels of Base Model #4, the first two kernels are focus filters and the last two kernels represent the emerging and vanishing of the features, respectively. These visualizations confirm that the changes of feature-level logits help to better capture temporal information between frames with the FTF-based modeling techniques presented herein.

Figure 12:
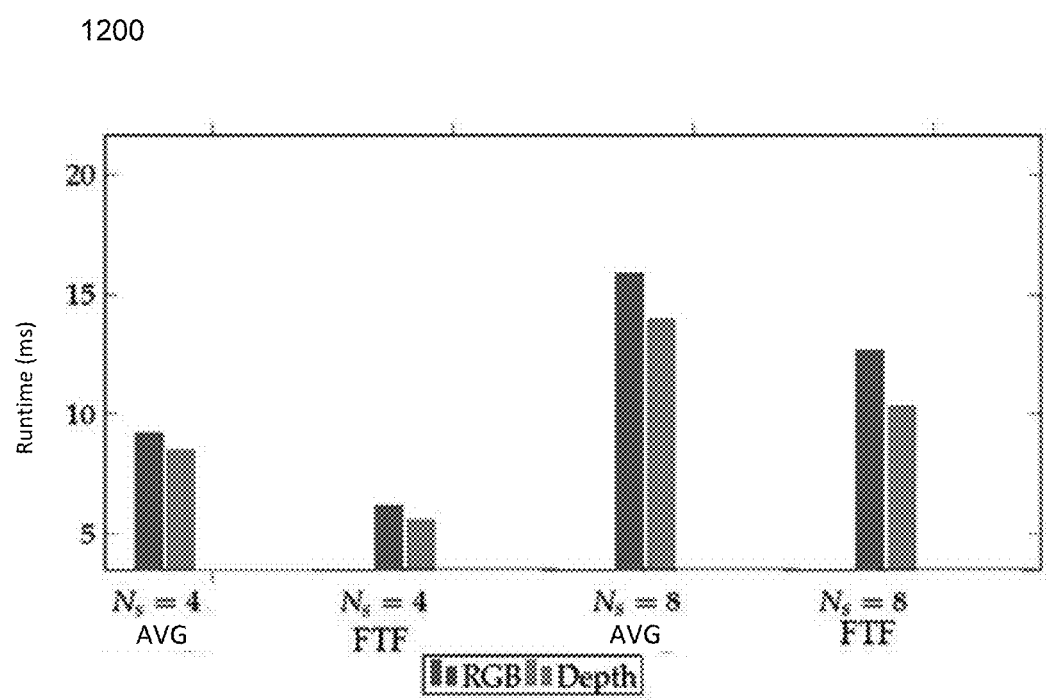
FIG. 12 shows a graph illustrating real-time performance analysis according to some aspects.

FIG. 12 shows a graph 1200 illustrating real-time performance analysis of the techniques proposed herein according to some aspects. The selected models were converted to an OpenVINO™ toolkit intermediate representation (IR) (Note: OpenVINO™ is a trademark of Intel Corporation or its subsidiaries) and tested with an inference pipeline on an Intel® Core™ i9 7940X processor (Note: Intel® and Intel Core™ are trademarks of Intel Corporation or its subsidiaries) using the FTF-based modeling techniques described herein. The single modality can run up to 138 frames per second (FPS) with RGB, making the whole inference pipeline able to operate at more than 30 FPS. CPU analysis was performed after optimizing the model with the OpenVINO™ toolkit, and real-time performance was able to be achieved using a CPU, thus eliminating the need for the more costly GPUs. RGB and depth modalities were used as input. The RGB modality is shown in the darker shading (on the left) for each of the $N_S$ pairs and the depth modality is shown on the lighter shading (on the right) for each of the $N_S$ pairs. The evaluations were done by selecting the number of segments ($N_S$) as 4 and 8 and the comparison analysis was performed against Averaging (AVG) based modeling. Graph 1200 shows that the FTF-based modeling techniques performed faster than the AVG-based techniques and were able to achieve real-time performance using only a CPU for both 4 and 8 numbers of segments.

FIG. 13 shows an exemplary flowchart 1300 describing a method to trigger a vehicular action based on monitoring one or more occupants of a vehicle according to some aspects. The method may include identifying a plurality of features in a plurality of subsets of image data detailing the one or more occupants 1302; tracking changes over time of the plurality of features over the plurality of subsets of image data 1304; determining a state, from a plurality of states, of the one or more occupants based on the tracked changes 1306; and triggering the vehicular action based on the determined state 1308. The method shown in flowchart 1300 may further include other aspects as described herein.

FIG. 14 shows a second exemplary flowchart 1400 describing a method to generate an instruction for a vehicle according to some aspects. The method may include detecting a plurality of objects in a series of video frames taken from video 1402; monitoring changes in the plurality objects across the series of video frames 1404; electing a condition, from a plurality of conditions, based on the monitored changes 1406; and generating the instruction for the vehicle based on the elected condition 1408. The method shown in flowchart 1400 may further include other aspects as described herein.

Figure 15:
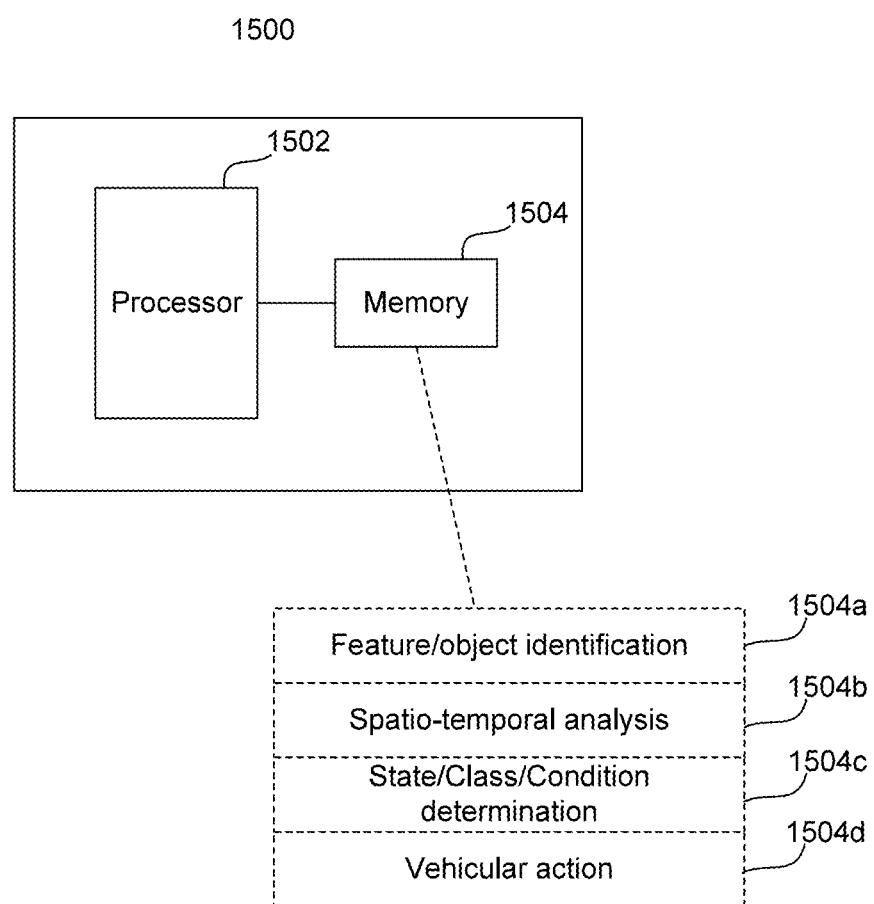
FIG. 15 shows an internal configuration of a device including a processor and a memory with subroutines to execute methods according to some aspects.

FIG. 15 shows an exemplary internal configuration of a device 1500 according to some aspects. As shown in FIG. 15, device 1500 may include processor 1502 and memory 1504. Processor 1502 may be a single processor or multiple processors, and may be configured to retrieve and execute program code to perform the transmission and reception, channel resource allocation, and cluster management as described herein. Processor 1502 may transmit and receive data over a software-level connection that is physically transmitted as wireless radio signals by radio frequency equipment. Memory 1504 may be a non-transitory computer readable medium storing instructions for one or more of: a feature/object identification subroutine 1504a, a spatio-temporal analysis subroutine 1504b, a state/class/condition determination subroutine 1504c, and a vehicular action subroutine 1504d. For example, processor 1504 may execute feature/object identification subroutine 1504a for implementing the 2D CNN 802 described in FIG. 8 and spatio-temporal analysis subroutine 1504b for implementing the temporal feature analysis technique described in 804. Processor 1504 may execute state/class/condition determination subroutine 1504c to determine a state (i.e., a class of a plurality of classes, e.g., shown in Table 1, i.e., a condition) and the vehicular action subroutine 1504d to trigger a vehicular action based on the determined state.

In the following, various aspects of the present disclosure will be illustrated

In Example 1, a device to trigger a vehicular action based on monitoring one or more occupants of a vehicle, the device including one or more processors configured to identify a plurality of features in a plurality of subsets of image data detailing the one or more occupants; track changes over time of the plurality of features over the plurality of subsets of image data; determine a state, from a plurality of states, of the one or more occupants based on the tracked changes; and trigger the vehicular action based on the determined state.

In Example 2, the subject matter of Example(s) 1 may include the one or more processors configured to receive data from one or more data acquisition devices, where the data includes the plurality of subsets of image data.

In Example 3, the subject matter of Example(s) 1-2 may include that the plurality of subsets of image data are based on video frames obtained from a video taken of the one or more occupants of the vehicle.

In Example 4, the subject matter of Example(s) 1-3 may include the one or more processors are configured to identify the plurality of features by providing inputs, based on the plurality of subsets of image data, to a two-dimensional convolutional neural network (2D CNN).

In Example 5, the subject matter of Example(s) 4 may include that the one or more processors are configured to implement the 2D CNN.

In Example 6, the subject matter of Example(s) 4-5 may include that the one or more processors are configured to determine each of the inputs, at least in part, based on a point location in each of the plurality of subsets of image data.

In Example 7, the subject matter of Example(s) 4-6 may include that the 2D CNN is trained to identify the plurality of features based on the inputs.

In Example 8, the subject matter of Example(s) 4-7 may include that the 2D CNN includes one or more convolutional layers, each including a plurality of nodes, to perform convolutions based on one or more kernels and a 2D CNN output layer to provide an output of the 2D CNN.

In Example 9, the subject matter of Example(s) 8 may include that the 2D CNN output layer includes a fully connected layer to provide the plurality of identified features.

In Example 10, the subject matter of Example(s) 4-9 may include that the 2D CNN provides an output including the identified plurality of features in each of the plurality of subsets of image data.

In Example 11, the subject matter of Example(s) 10 may include that the output includes a plurality of segments, where each of the plurality of segments corresponds to a respective subset of the plurality of subsets of image data, and where each segment includes a value corresponding to each of the plurality of features.

In Example 12, the subject matter of Example(s) 11 may include that the value for each respective feature ranges from a minimum to a maximum, where the minimum indicates that the respective feature is non-existent in the segment and an increase in the value towards the maximum indicates that the respective feature is more prevalent in the segment.

In Example 13, the subject matter of Example(s) 1-12 may include that the one or more processors are configured to track the changes by providing the plurality of features in the plurality of subsets of image data in a series of segments as inputs to a spatio-temporal model, where each segment corresponds to a subset of image data of the plurality of subsets of image data.

In Example 14, the subject matter of Example(s) 13 may include that the one or more processors are configured to implement the spatio-temporal model.

In Example 5, the subject matter of Example(s) 13-14 may include that each segment includes a plurality of values, where each value in the plurality of values corresponds to a respective feature of the identified plurality of features and ranges from a minimum to a maximum, where the minimum indicates that the respective feature is non-existent in the segment and an increase in the value towards the maximum indicates that the respective feature is more prevalent in the segment.

In Example 16, the subject matter of Example(s) 15 may include that the spatio-temporal model includes a plurality of kernels to track changes in the values corresponding to a respective feature across the series of segments.

In Example 17, the subject matter of Example(s) 16 may include that the one or more processors are configured to track the changes by identifying an increase in the value of a respective feature across the series of segments, where the increase in value corresponds to an emergence of the feature.

In Example 18, the subject matter of Example(s) 16-17 may include that the one or more processors are configured to track the changes by identifying a decrease in the value of a respective feature across the series of segments, where the decrease in value corresponds to the feature vanishing.

In Example 19, the subject matter of Example(s) 13-18 may include that the spatio-temporal model includes an output layer which provides a score for each of the plurality of states.

In Example 20, the subject matter of Example(s) 19 may include that a respective score for each of the plurality of states is based on the tracking of changes of plurality of features across the segments of the spatio-temporal model.

In Example 21, the subject matter of Example(s) 18-19 may include that determining the state, from the plurality of states, of the one or more occupants includes selecting a state from the plurality of states with a highest score.

In Example 22, the subject matter of Example(s) 1-21 may include that the one or more processors are configured to determine the state of the one or more occupants by selecting a state from the plurality of states with a highest probability of occurrence based on the tracked changes of each of the plurality of features.

In Example 23, the subject matter of Example(s) 1-22 may include that each of the plurality of states corresponds to a status of the one or more occupants.

In Example 24, the subject matter of Example(s) 1-23 may include that each of the plurality of states has a time value associated with it.

In Example 25, the subject matter of Example(s) 24 may include that each time value is based on an estimated reaction time of a driver of the vehicle.

In Example 26, the subject matter of Example(s) 24-25 may include that the one or more processors are configured to trigger the vehicular action by calculating a theoretical safe distance based on the time value.

In Example 27, the subject matter of Example(s) 26 may include that the one or more processors are configured to calculate the theoretical safe distance being additionally based on a current velocity of the vehicle.

In Example 28, the subject matter of Example(s) 26-27 may include that the one or more processors are configured to calculate the theoretical safe distance being additionally based on a braking acceleration capability of the vehicle.

In Example 29, the subject matter of Example(s) 1-28 may include that the data includes a second set of data corresponding to one or more objects detected outside of the vehicle.

In Example 30, the subject matter of Example(s) 29 may include that one or more of the one or more detected objects is another vehicle.

In Example 31, the subject matter of Example(s) 29-30 may include that the one or more processors are configured to determine a real physical distance to the one or more detected objects.

In Example 32, the subject matter of Example(s) 31 may include that the one or more processors are configured to trigger the vehicular action based on a comparison of the theoretical sage distance and the real physical distance.

In Example 33, the subject matter of Example(s) 32 may include that the one or more processors are configured to trigger the vehicular action by modifying one or more driving parameters based on the comparison.

In Example 34, the subject matter of Example(s) 33 may include that the one or more driving parameters affect a mobility of the vehicle, where the mobility includes at least one of a braking, an acceleration, or a steering of the vehicle.

In Example 35, the subject matter of Example(s) 1-34 may include that the vehicular action includes a notification to the driver. The notification may be sent to the one or more passengers via a user interface.

In Example 36, the subject matter of Example(s) 35 may include that the notification includes at least one of a visual notification, a sound notification, or a vibration notification.

In Example 37, the subject matter of Example(s) 35-36 may include that the notification triggers a second vehicular action based on a predicted change in state from the determined state to a second state of the plurality of states.

In Example 38, the subject matter of Example(s) 37 may include that the second state has a corresponding time value that is less than the time value of the determined state.

In Example 39, the subject matter of Example(s) 1-38 may include an interface configured to communicate with each of the one or more data acquisition devices.

In Example 40, the subject matter of Example(s) 39 may include that at least one of the one or more data acquisition devices is a camera configured to provide at least one of a color, depth, or infrared data of the one or more occupants of the vehicle.

In Example 41, the subject matter of Example(s) 40 may include that at least one of the data acquisition devices is configured to provide information to determine a location of and/or distance to one or more objects in the environment outside of the vehicle.

In Example 42, the subject matter of Example(s) 1-41 may include a vehicular control interface to communicate with a controller of a mobility system of the vehicle.

In Example 43, a vehicular control device configured to generate an instruction for a vehicle, the vehicular control device including one or more processors configured to detect a plurality of objects in a series of video frames taken from a video; monitor changes in the plurality objects across the series of video frames; elect a condition, from a plurality of conditions, based on the monitored changes; and generate the instruction for the vehicle based on the elected condition.

In Example 44, the subject matter of Example(s) 43 may include the one or more processors coupled to one or more cameras, where the one or more cameras provide the video.

In Example 45, the subject matter of Example(s) 43-44 may include the one or more processors configured to detect the plurality of objects by providing inputs, based on the series of video frames, to a two-dimensional convolutional neural network (2D CNN).

In Example 46, the subject matter of Example(s) 45 may include that the one or more processors are configured to determine each of the inputs, at least in part, based on a point location in each of video frames.

In Example 47, the subject matter of Example(s) 45-46 may include that the 2D CNN is trained to detect the plurality of objects based on the inputs.

In Example 48, the subject matter of Example(s) 45-47 may include that the 2D CNN provides an output including values corresponding to the detected plurality of objects in each of the series of video frames.

In Example 49, the subject matter of Example(s) 45-47 may include that the output includes a plurality of segments, where each of the plurality of segments corresponds to a video frame of the series of video frames, and where each segment includes a value corresponding to each of the plurality of objects for the corresponding video frame.

In Example 50, the subject matter of Example(s) 49 may include that a value for each respective object ranges from a minimum to a maximum, where the minimum indicates that the respective object is non-existent in the segment and an increase in the value towards the maximum indicates that the respective object is more prevalent in the segment.

In Example 51, the subject matter of Example(s) 44-50 may include the one or more processors configured to monitor changes by providing a series of segments as inputs to a spatio-temporal model, where each segment corresponds to a video frame of the series of video frames.

In Example 52, the subject matter of Example(s) 51 may include that each segment includes a plurality of values, where each value in the plurality of values corresponds to an object of the plurality of objects and ranges from a minimum to a maximum, where the minimum indicates that the respective object is non-existent in the segment and an increase in the value towards the maximum indicates that the respective object is more prevalent in the segment.

In Example 53, the subject matter of Example(s) 52 may include the one or more processors configured to monitor the changes by identifying an increase in the value of a respective object across the series of segments, where the increase in value corresponds to an emergence of the feature.

In Example 54, the subject matter of Example(s) 52-53 may include the one or more processors configured monitor the changes by identifying a decrease in the value of a respective object across the series of segments, where the decrease in value corresponds to the object vanishing.

In Example 55, the subject matter of Example(s) 51-54 may include that the spatio-temporal model includes an output layer which provides a score for each of the plurality of conditions.

In Example 56, the subject matter of Example(s) 55 may include that a respective score for each of the plurality of conditions is based on the monitoring of plurality of objects across the segments.

In Example 57, the subject matter of Example(s) 55-56 may include that electing the condition, from the plurality of conditions, includes selecting a state from the plurality of states with a highest score.

In Example 58, the subject matter of Example(s) 43-57 may include that the one or more processors are configured to elect the condition by selecting a condition from the plurality of conditions with a highest probability of occurrence based on the monitored changes of each of the plurality of objects.

In Example 59, the subject matter of Example(s) 43-58 may include that each of the plurality of conditions corresponds to a status of one or more occupants of the vehicle.

In Example 60, the subject matter of Example(s) 43-59 may include that each of the plurality of conditions has a time value associated with it.

In Example 61, the subject matter of Example(s) 60 may include that each time value is based on an estimated reaction time of a driver of the vehicle.

In Example 62, the subject matter of Example(s) 60-61 may include that the one or more processors are configured to trigger the generate the instruction by calculating a theoretical safe distance based on the time value.

In Example 63, the subject matter of Example(s) 62 may include that the one or more processors are configured to calculate the theoretical safe distance being additionally based on a current velocity of the vehicle.

In Example 64, the subject matter of Example(s) 62-63 may include that the one or more processors are configured to calculate the theoretical safe distance being additionally based on a braking acceleration capability of the vehicle.

In Example 65, the subject matter of Example(s) 43-64 may include the one or more processors configured to receive a second set of data corresponding to one or more objects detected outside of the vehicle.

In Example 66, the subject matter of Example(s) 65 may include that one or more of the one or more detected objects is another vehicle.

In Example 67, the subject matter of Example(s) 65-66 may include that the one or more processors are configured to determine a real physical distance to the one or more detected objects In Example 68, the subject matter of Example(s) 67 may include that the one or more processors are configured to generate the instruction based on a comparison of the theoretical safe distance and the real physical distance.

In Example 69, the subject matter of Example(s) 68 may include that the one or more processors are configured to generate the instruction by modifying one or more driving parameters based on the comparison.

In Example 70, the subject matter of Example(s) 69 may include that the one or more driving parameters affect a mobility of the vehicle, where the mobility includes at least one of a braking, an acceleration, or a steering of the vehicle.

In Example 71, the subject matter of Example(s) 43-70 may include that the vehicular action includes a notification to the driver.

In Example 72, the subject matter of Example(s) 71 may include that the notification includes at least one of a visual notification, a sound notification, or a vibration notification.

In Example 73, the subject matter of Example(s) 71-72 may include that the notification triggers a second vehicular action based on a predicted change in state from the determined state to a second state of the plurality of states.

In Example 74, the subject matter of Example(s) 73 may include that the second state has a corresponding time value that is less than the time value of the determined state In Example 75, the subject matter of Example(s) 43-74 may include an interface configured to communicate with the one or more data acquisition devices of the vehicle.

In Example 76, the subject matter of Example(s) 74 may include that at least one of the one or more data acquisition devices is a camera configured to provide the video, where the video includes at least one of a color, depth, or infrared data of the one or more occupants of the vehicle.

In Example 77, a device including an identifier configured to identify a plurality of features in a plurality of subsets of image data detailing the one or more occupants; a tracker configured to track changes over time of the plurality of features over the plurality of subsets of image data; a determiner configured to determine a state, from a plurality of states, of the one or more occupants based on the tracked changes; and a controller configured to trigger the vehicular action based on the determined state.

In Example 78, a device including a detector configured to detect a plurality of objects in a series of video frames taken from video; a monitor configured to monitor changes in the plurality objects across the series of video frames; a selector configured to elect a condition, from a plurality of conditions, based on the monitored changes; and a generator configured to generate the instruction based on the elected condition.

In Example 79, a method to trigger a vehicular action based on monitoring one or more occupants of a vehicle, the method including identifying a plurality of features in a plurality of subsets of image data detailing the one or more occupants; tracking changes over time of the plurality of features over the plurality of subsets of image data; determining a state, from a plurality of states, of the one or more occupants based on the tracked changes; and triggering the vehicular action based on the determined state.

In Example 80, the subject matter of Example(s) 79 may include receiving data from one or more data acquisition devices, where the data includes the plurality of subsets of image data.

In Example 81, the subject matter of Example(s) 79-80 may include that the plurality of subsets of image data are based on video frames obtained from a video taken of the one or more occupants of the vehicle.

In Example 82, the subject matter of Example(s) 79-81 may include identifying the plurality of features by providing inputs, based on the plurality of subsets of image data, to a two-dimensional convolutional neural network (2D CNN).

In Example 83, the subject matter of Example(s) 82 may include implementing the 2D CNN.

In Example 84, the subject matter of Example(s) 82-83 may include determining each of the inputs, at least in part, based on a point location in each of the plurality of subsets of image data.

In Example 85, the subject matter of Example(s) 82-84 may include that the 2D CNN is trained to identify the plurality of features based on the inputs.

In Example 86, the subject matter of Example(s) 82-85 may include that the 2D CNN includes one or more convolutional layers, each including a plurality of nodes, to perform convolutions based on one or more kernels and a 2D CNN output layer to provide an output of the 2D CNN.

In Example 87, the subject matter of Example(s) 86 may include that the 2D CNN output layer includes a fully connected layer to provide the plurality of identified features.

In Example 88, the subject matter of Example(s) 82-87 may include that the 2D CNN provides an output including the identified plurality of features in each of the plurality of subsets of image data.

In Example 89, the subject matter of Example(s) 88 may include that the output includes a plurality of segments, where each of the plurality of segments corresponds to a respective subset of the plurality of subsets of image data, and where each segment includes a value corresponding to each of the plurality of features.

In Example 90, the subject matter of Example(s) 89 may include that the value for each respective feature ranges from a minimum to a maximum, where the minimum indicates that the respective feature is non-existent in the segment and an increase in the value towards the maximum indicates that the respective feature is more prevalent in the segment.

In Example 91, the subject matter of Example(s) 79-90 may include tracking the changes by providing the plurality of features in the plurality of subsets of image data in a series of segments as inputs to a spatio-temporal model, where each segment corresponds to a subset of image data of the plurality of subsets of image data.

In Example 92, the subject matter of Example(s) 91 may include implementing the spatio-temporal model.

In Example 93, the subject matter of Example(s) 91-92 may include that each segment includes a plurality of values, where each value in the plurality of values corresponds to a respective feature of the identified plurality of features and ranges from a minimum to a maximum, where the minimum indicates that the respective feature is non-existent in the segment and an increase in the value towards the maximum indicates that the respective feature is more prevalent in the segment.

In Example 94, the subject matter of Example(s) 93 may include that the spatio-temporal model includes a plurality of kernels to track changes in the values corresponding to a respective feature across the series of segments.

In Example 95, the subject matter of Example(s) 94 may include tracking the changes by identifying an increase in the value of a respective feature across the series of segments, where the increase in value corresponds to an emergence of the feature.

In Example 96, the subject matter of Example(s) 94-95 may include tracking the changes by identifying a decrease in the value of a respective feature across the series of segments, where the decrease in value corresponds to the feature vanishing.

In Example 97, the subject matter of Example(s) 91-96 may include that the spatio-temporal model includes an output layer which provides a score for each of the plurality of states.

In Example 98, the subject matter of Example(s) 97 may include that a respective score for each of the plurality of states is based on the tracking of changes of plurality of features across the segments of the spatio-temporal model.

In Example 99, the subject matter of Example(s) 96-98 may include that determining the state, from the plurality of states, of the one or more occupants includes selecting a state from the plurality of states with a highest score.

In Example 100, the subject matter of Example(s) 79-99 may include determining the state of the one or more occupants by selecting a state from the plurality of states with a highest probability of occurrence based on the tracked changes of each of the plurality of features.

In Example 101, the subject matter of Example(s) 79-100 may include that each of the plurality of states corresponds to a status of the one or more occupants.

In Example 102, the subject matter of Example(s) 79-101 may include that each of the plurality of states has a time value associated with it.

In Example 103, the subject matter of Example(s) 102 may include that each time value is based on an estimated reaction time of a driver of the vehicle.

In Example 104, the subject matter of Example(s) 102-103 may include triggering the vehicular action by calculating a theoretical safe distance based on the time value.

In Example 105, the subject matter of Example(s) 104 may include calculating the theoretical safe distance based on a current velocity of the vehicle.

In Example 106, the subject matter of Example(s) 104-105 may include calculating the theoretical safe distance based on a braking acceleration capability of the vehicle.

In Example 107, the subject matter of Example(s) 79-106 may include that the data includes a second set of data corresponding to one or more objects detected outside of the vehicle.

In Example 108, the subject matter of Example(s) 107 may include that one or more of the one or more detected objects is another vehicle.

In Example 109, the subject matter of Example(s) 107-108 may include determining a real physical distance to the one or more detected objects In Example 110, the subject matter of Example(s) 109 may include triggering the vehicular action based on a comparison of the calculated distance and a distance to the one or more detected objects.

In Example 111, the subject matter of Example(s) 110 may include triggering the vehicular action by modifying one or more driving parameters based on the comparison.

In Example 112, the subject matter of Example(s) 111 may include that the one or more driving parameters affect a mobility of the vehicle, where the mobility includes at least one of a braking, an acceleration, or a steering of the vehicle.

In Example 113, the subject matter of Example(s) 79-112 may include that the vehicular action includes a notification to the driver.

In Example 114, the subject matter of Example(s) 113 may include that the notification includes at least one of a visual notification, a sound notification, or a vibration notification.

In Example 115, the subject matter of Example(s) 113-114 may include the notification triggering a second vehicular action based on a predicted change in state from the determined state to a second state of the plurality of states.

In Example 116, the subject matter of Example(s) 115 may include that the second state has a corresponding time value that is less than the time value of the determined state In Example 117, the subject matter of Example(s) 79-116 may include communicating, via an interface, with each of the one or more data acquisition devices.

In Example 118, the subject matter of Example(s) 117 may include that at least one of the one or more data acquisition devices is a camera configured to provide at least one of a color, depth, or infrared data of the one or more occupants of the vehicle.

In Example 119, the subject matter of Example(s) 118 may include that at least one of the data acquisition devices is configured to provide information to determine a location of and/or distance to one or more objects in the environment outside of the vehicle.

In Example 120, a method to generate an instruction for a vehicle, the method including detecting a plurality of objects in a series of video frames taken from video; monitoring changes in the plurality objects across the series of video frames; electing a condition, from a plurality of conditions, based on the monitored changes; and generating the instruction for the vehicle based on the elected condition.

In Example 121, the subject matter of Example 120 may include performing the steps described in Examples 43-76.

In Example 122, a device including means to identify a plurality of features in a plurality of subsets of image data detailing the one or more occupants; track changes over time of the plurality of features over the plurality of subsets of image data; determine a state, from a plurality of states, of the one or more occupants based on the tracked changes; and trigger the vehicular action based on the determined state.

In Example 123, a device including means to detect a plurality of objects in a series of video frames taken from video; monitor changes in the plurality objects across the series of video frames; elect a condition, from a plurality of conditions, based on the monitored changes; and generate the instruction based on the elected condition.

In Example 124, one or more non-transitory computer readable media including instructions thereon that, when executed by one or more processors of a device, cause the device to perform the method or realize a device as claimed in any preceding Example.

In Example 125, a system including a device or implementing a method as described in any preceding Example.

While the above descriptions and connected figures may depict device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A system for triggering a vehicular action based on monitoring of one or more occupants of a vehicle, the system comprising:
   at least one processor comprising circuitry and a memory, wherein the memory includes instructions that when executed by the circuitry cause the at least one processor to:
   receive, from an image acquisition device, a plurality of subsets of image data detailing the one or more occupants;
   identify a plurality of features of the one or more occupants in the plurality of subsets of image data;
   identify, based on the plurality of subsets of image data, at least one change in the plurality of features over time;
   determine a state of the one or more occupants from a plurality of states based on the at least one change;
   determine, based on the determined state of the one or more occupants and an assumed maximum acceleration value of the vehicle, a theoretical safe distance between the vehicle and at least one object; and
   trigger the vehicular action based on the determined theoretical safe distance.

2. The system of claim 1, wherein each of the plurality of states is associated with a corresponding time value and wherein the theoretical safe distance is determined based on a time value associated with the determined state of the one or more occupants.

3. The system of claim 2, wherein the time value represents an estimated reaction time of the driver.

4. The system of claim 3, wherein the theoretical safe distance includes a distance the vehicle would travel when the driver does not apply the brake during the estimated reaction time.

5. The system of claim 3, wherein the theoretical safe distance includes a distance the vehicle would travel when the vehicle accelerates at the maximum acceleration value during the estimated reaction time.

6. The system of claim 3, wherein the theoretical safe distance includes a distance to reduce a determined speed of the vehicle to zero at a maximum braking rate of the vehicle.

7. The system of claim 6, wherein the determined speed corresponds to a speed of the vehicle when the vehicle accelerates at the maximum acceleration value of the vehicle over the estimated reaction time.

8. The system of claim 2, wherein the time value is determined using a look-up table correlating the plurality of states to the corresponding time values.

9. The system of claim 1, wherein determining the state of the one or more occupants includes selecting a state from the plurality of states having a highest probability of occurrence based on the at least one change in the plurality of features.

10. The system of claim 1, wherein the memory includes instructions that when executed by the circuitry further cause the at least one processor to determine a real physical distance to the at least one object.

11. The system of claim 10, wherein triggering the vehicular action based on the determined theoretical safe distance includes comparing the theoretical safe distance to the real physical distance.

12. The system of claim 11, wherein triggering the vehicular action includes causing a braking response of the vehicle until the physical distance exceeds the theoretical safe distance.

13. The system of claim 1, wherein the theoretical safe distance between the vehicle and at least one object is further determined based on an assumed minimum braking rate of the vehicle.

14. The system of claim 1, wherein triggering the vehicular action includes causing a notification to be presented to the at least one occupant.

15. The system of claim 14, wherein the notification is presented via a user interface of the vehicle.

16. The system of claim 1, wherein the vehicular action includes a braking response of the vehicle.

17. The system of claim 1, wherein identifying the plurality of features includes inputting the plurality of subsets of image data into a neural network.

18. The system of claim 17, wherein the neural network includes a two-dimensional convolutional neural network (2D CNN).

19. A method for triggering a vehicular action based on monitoring of one or more occupants of a vehicle, the method comprising:
   receiving, from an image acquisition device, a plurality of subsets of image data detailing the one or more occupants;
   identifying a plurality of features of the one or more occupants in the plurality of subsets of image data;
   identifying, based on the plurality of subsets of image data, at least one change in the plurality of features over time;
   determining a state of the one or more occupants from a plurality of states based on the at least one change;
   determining, based on the determined state of the one or more occupants and an assumed maximum acceleration value of the vehicle, a theoretical safe distance between the vehicle and at least one object; and triggering the vehicular action based on the determined theoretical safe distance.

20. The method of claim 19, wherein each of the plurality of states is associated with a corresponding time value and wherein the theoretical safe distance is determined based on a time value associated with the determined state of the one or more occupants.

21. The method of claim 20, wherein the time value represents an estimated reaction time of the driver.

22. The method of claim 19, wherein the method further includes determining a real physical distance to the at least one object and wherein triggering the vehicular action based on the determined theoretical safe distance includes comparing the theoretical safe distance to the real physical distance.

23. A non-transitory computer readable medium containing instructions that when executed by at least one processor, cause the at least one processor to perform a method for triggering a vehicular action based on monitoring of one or more occupants of a vehicle, the method comprising:

receiving, from an image acquisition device, a plurality of subsets of image data detailing the one or more occupants;

identifying a plurality of features of the one or more occupants in the plurality of subsets of image data;

identifying, based on the plurality of subsets of image data, at least one change in the plurality of features over time;

determining a state of the one or more occupants from a plurality of states based on the at least one change;

determining, based on the determined state of the one or more occupants and an assumed maximum acceleration value of the vehicle, a theoretical safe distance between the vehicle and at least one object; and triggering the vehicular action based on the determined theoretical safe distance.

* * * * *